United States Patent [19]

Squillante et al.

[11] Patent Number: 5,007,019

[45] Date of Patent: Apr. 9, 1991

[54] ELECTRONIC THESAURUS WITH ACCESS HISTORY LIST

[75] Inventors: Peter L. Squillante, Central Islip; Julius Egyud, Dix Hills; Abraham Karron, Long Beach, all of N.Y.

[73] Assignee: Franklin Electronic Publishers, Incorporated, Mt. Holly, N.J.

[21] Appl. No.: 294,058

[22] Filed: Jan. 5, 1989

[51] Int. Cl.⁵ .............................................. G06F 15/40
[52] U.S. Cl. .................................... 364/900; 364/419; 364/943.42
[58] Field of Search .............. 364/419, 300, 225.6 MJ, 364/963, 975, 943.42

[56] References Cited

U.S. PATENT DOCUMENTS

| | | | |
|---|---|---|---|
| 3,932,859 | 1/1976 | Kyriakides et al. | 364/900 X |
| 4,384,329 | 5/1983 | Rosenbaum et al. | 364/300 |
| 4,796,185 | 1/1989 | Yoshimura et al. | 364/900 X |

OTHER PUBLICATIONS

"Franklin Language Master" brochure, Franklin Computer @1987.

Roget's II–The New Theasurus, Houghton Mifflin Co., @1980 preface and back cover only.
C. Stewart, III et al., "Using Wordperfect 5", Que Corporation @1988, pp. 250–256.

*Primary Examiner*—Clark A. Jablon
*Assistant Examiner*—Steven G. Kibby
*Attorney, Agent, or Firm*—McAulay Fisher Nissen Goldberg & Kiel

[57] ABSTRACT

An electronic dictionary has a keyboard for entering words, which words are displayed along with a set of synonyms divided into subsets, each subset having a displayed common core meaning. The original word entered by the user for which synonyms and related words are sought is put into a history list. The user can select any of the synonyms or any of the words from the core meaning presented, or can independently enter any desired word and add those entered words to the history list. In this fashion, the user can build up a history list which can be reviewed by the user and any word in the history list re-accessed, so that the user can track through the history list and explore any desired complex arrangement of concepts, ideas, and relationships. As the history list becomes full, the earliest additional entry words are deleted in sequence.

4 Claims, 6 Drawing Sheets

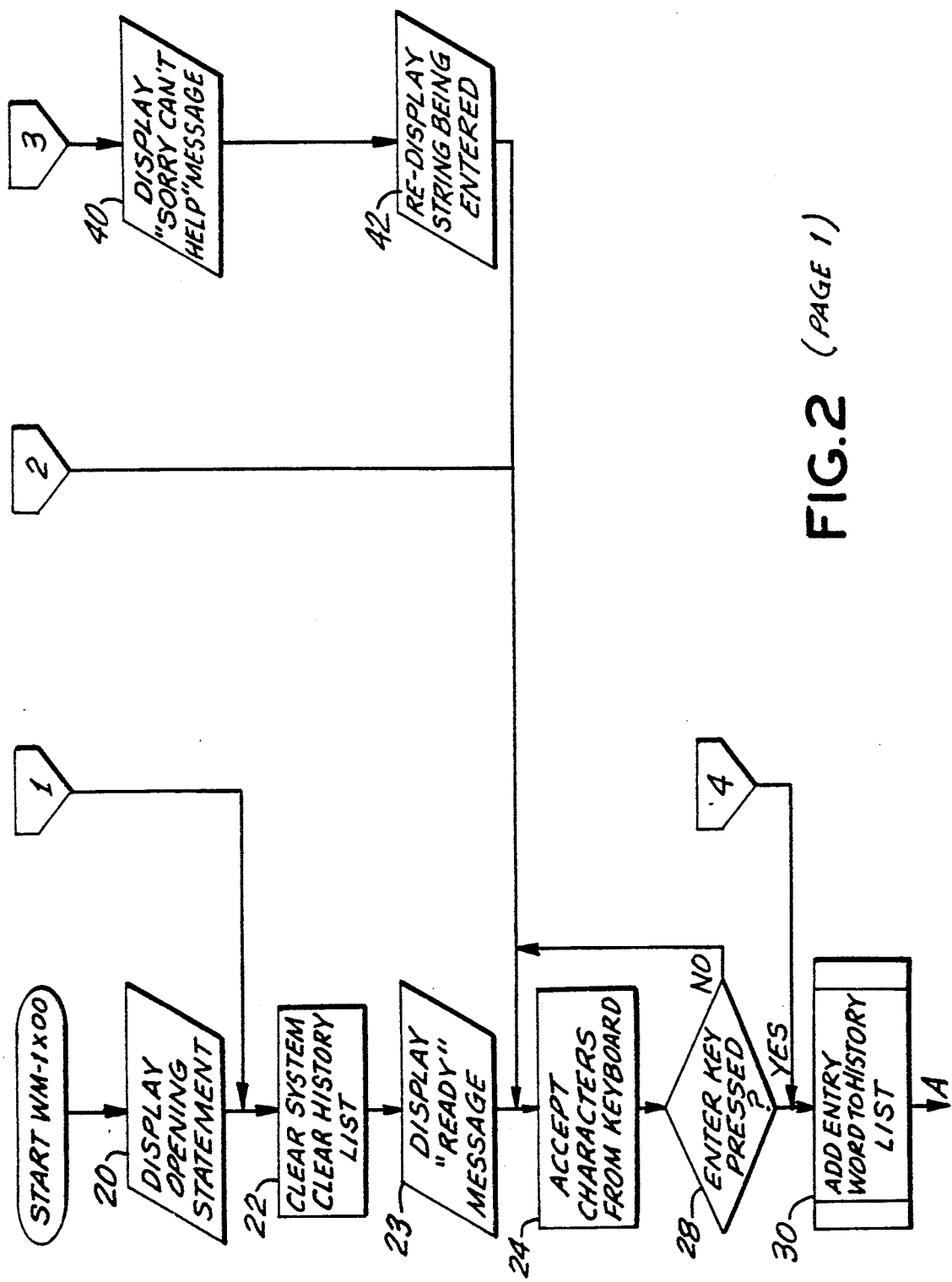
FIG. 2 (PAGE 1)

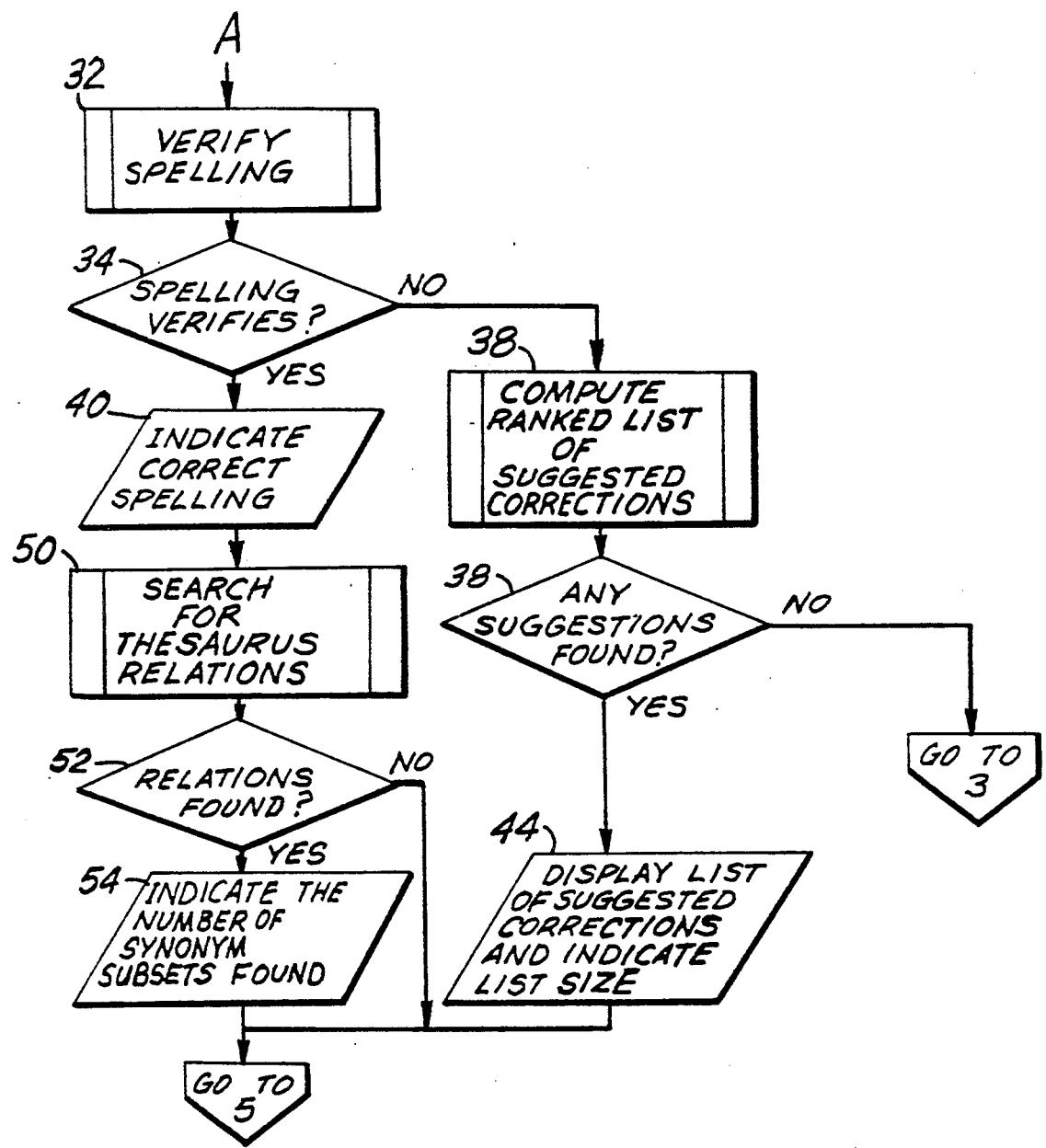
FIG.2 (PAGE 2)

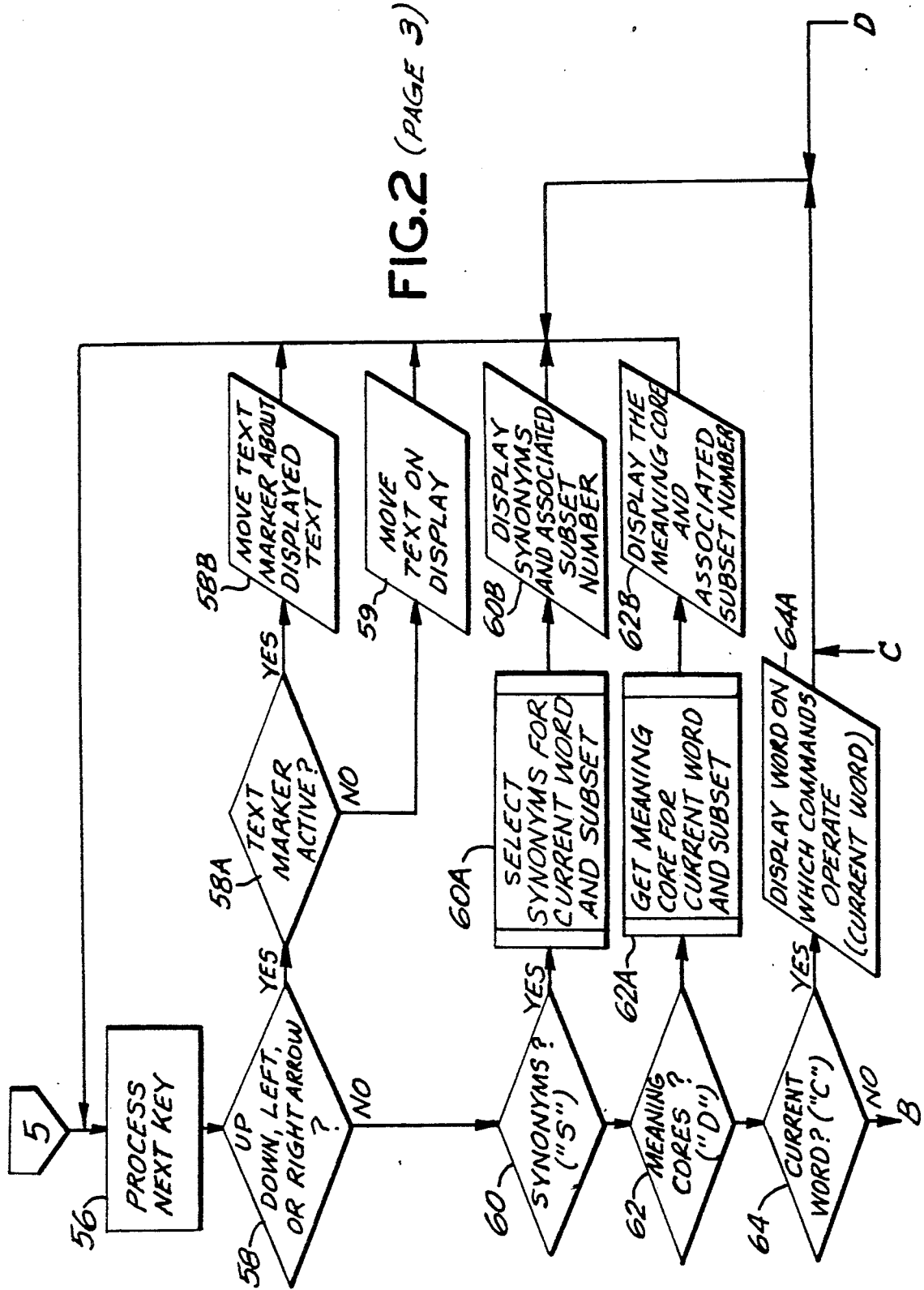

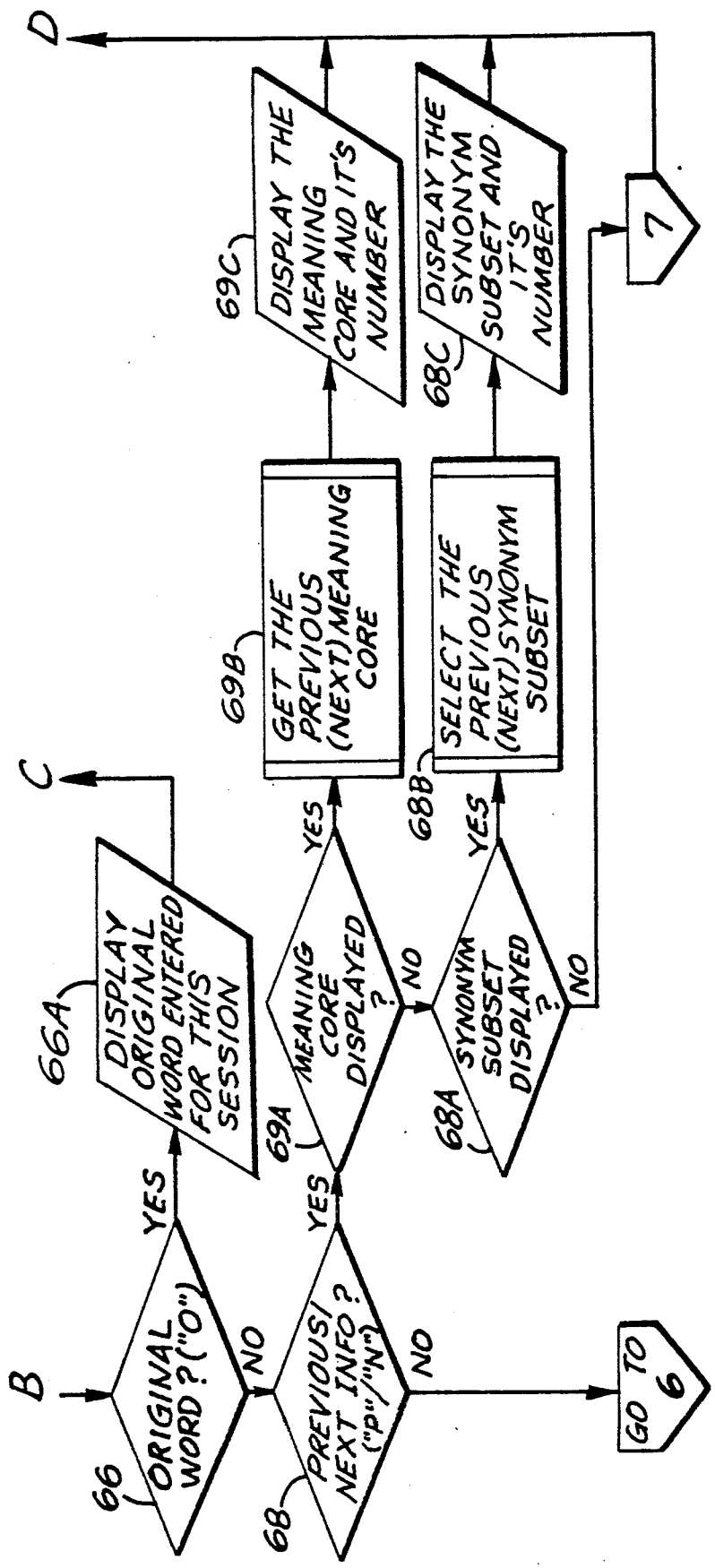
FIG.2 (PAGE 4)

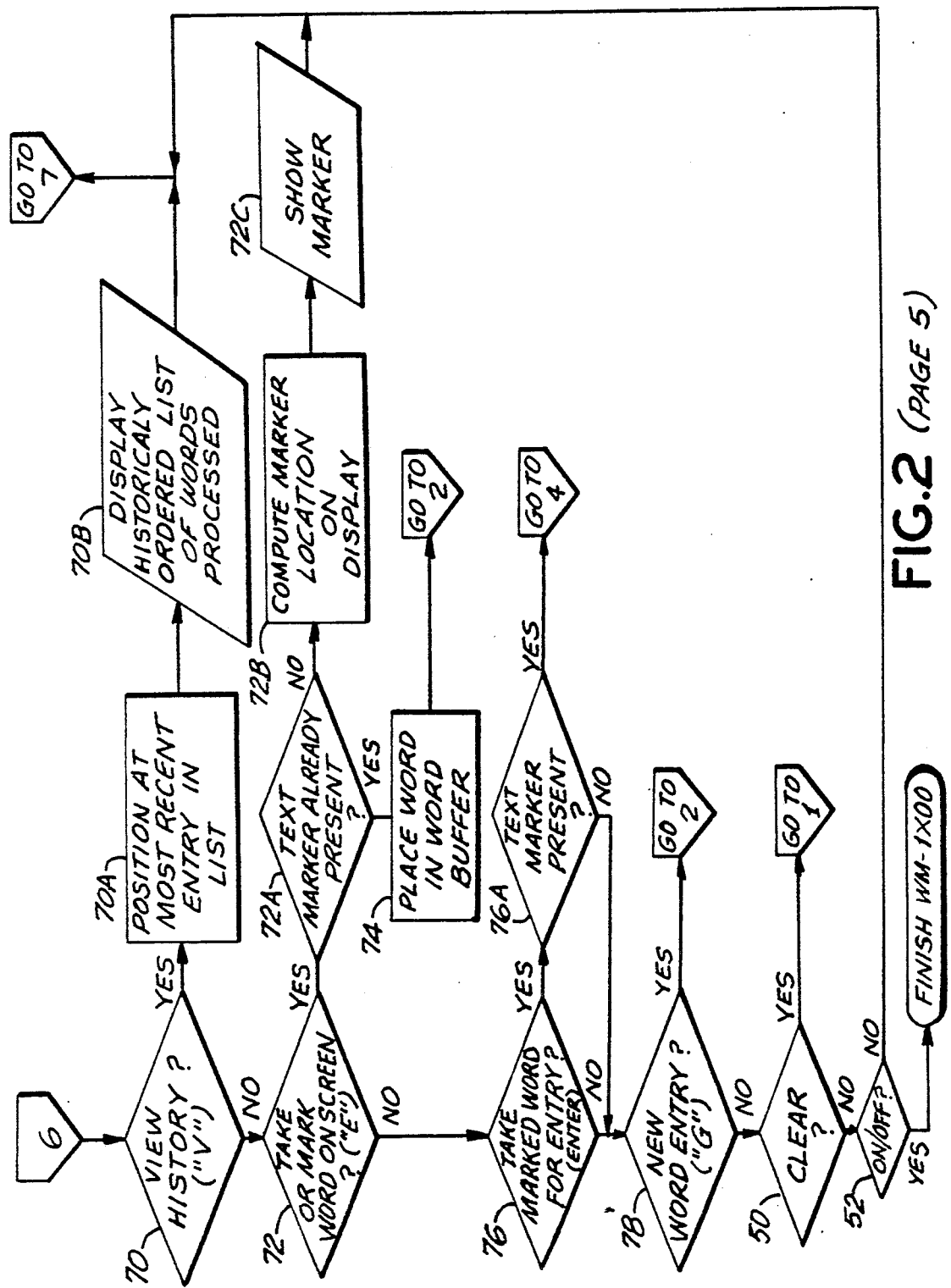
FIG.2 (PAGE 5)

ELECTRONIC THESAURUS WITH ACCESS HISTORY LIST

BACKGROUND OF THE INVENTION

This invention relates in general to an electronic thesaurus and in particular to one enabling a user to track through a series of related words, to obtain an extensive set of related meanings and to enable the user to back track through key words.

The utility of a thesaurus can be enhanced by permitting the user to explore various avenues of meaning and by providing appropriate groupings of related words both in terms of synonyms and subsets of synonyms having essentially the same core meaning. Such a thesaurus is particularly useful where the user can readily track through a wide variety of related words, explore byways of meaning and readily return to those words that the user finds most relevant to the meaning or nuance of meaning being sought.

For such a complex tracking and investigative technique to be useful, it is important to provide the user not only with rapid response to an inquiry but also with a rapid technique for re-accessing related words earlier considered.

Accordingly, it is a major purpose of this invention to provide an electronic thesaurus in a compact easily usable form that provides functions which give the user optimum flexibility to track through a series of words, explore byways of meaning, return to the main tracking of words and to permit re-accessing any word deemed by the user to be of primary significance to the user.

BRIEF DESCRIPTION

In brief, one embodiment of this invention is a desk top or hand held programed electronic device having a display screen and a keyboard for entering characters and functions into the device. An operator can enter any word, including a misspelled word, and upon pressing of an enter key the entered word is processed to provide a set of synonyms. The set of synonyms is divided into subsets. Membership in each subset is determined by those synonyms which have the same meaning core. In this fashion subsets of the set of synonyms are grouped around a meaning core. The keyboard permits viewing the synonyms and the meaning core. The meaning core is essentially an abbreviated definition providing the core meaning for the group of words in the subset.

The user is then able to perform various edit functions. These edit functions permit the user to enter selected words and build a history list of significant related words and to track through the synonyms and definitions for each of those related words. Because of the history list, the user can re-access words in the history list to review the word, its synonyms and the core meaning of each subset of synonyms associated with the re-accessed word.

The edit functions permit the user to enter words and add them to the history list in a number of fashions. One edit function permits the user to add to the history list any one of the synonyms provided for an entry word. A second edit function permits the user to select any one of the words in a meaning core definition and add that selected word to the history list. A third edit function permits the user to clear the screen without clearing the history list and enter any word desired by the user thereby adding that word to the history list.

When any one of these selected terms (that is either a synonym, a word from a meaning core or a word put in by the user) is made an entry word and thus added to the history list, it in turn is processed to provide a set of synonyms divided into subsets in accordance with the meaning core of each subset.

Although there may be some overlap between the set of synonyms provided for each additional entry word and the set of synonyms for the original entry word, there normally is significant distinction. Thus the user can track through various sets of synonyms by continuing to select additional words as entry words to obtain a complex arrangement of concepts, ideas and relationships.

BRIEF DESCRIPTION OF THE DRAWINGS

FIGS. 2a-2d are a flow chart of the operation of the thesaurus edit functions of the FIG. 1 device.

DESCRIPTION OF THE PREFERRED EMBODIMENT

Figure 1:
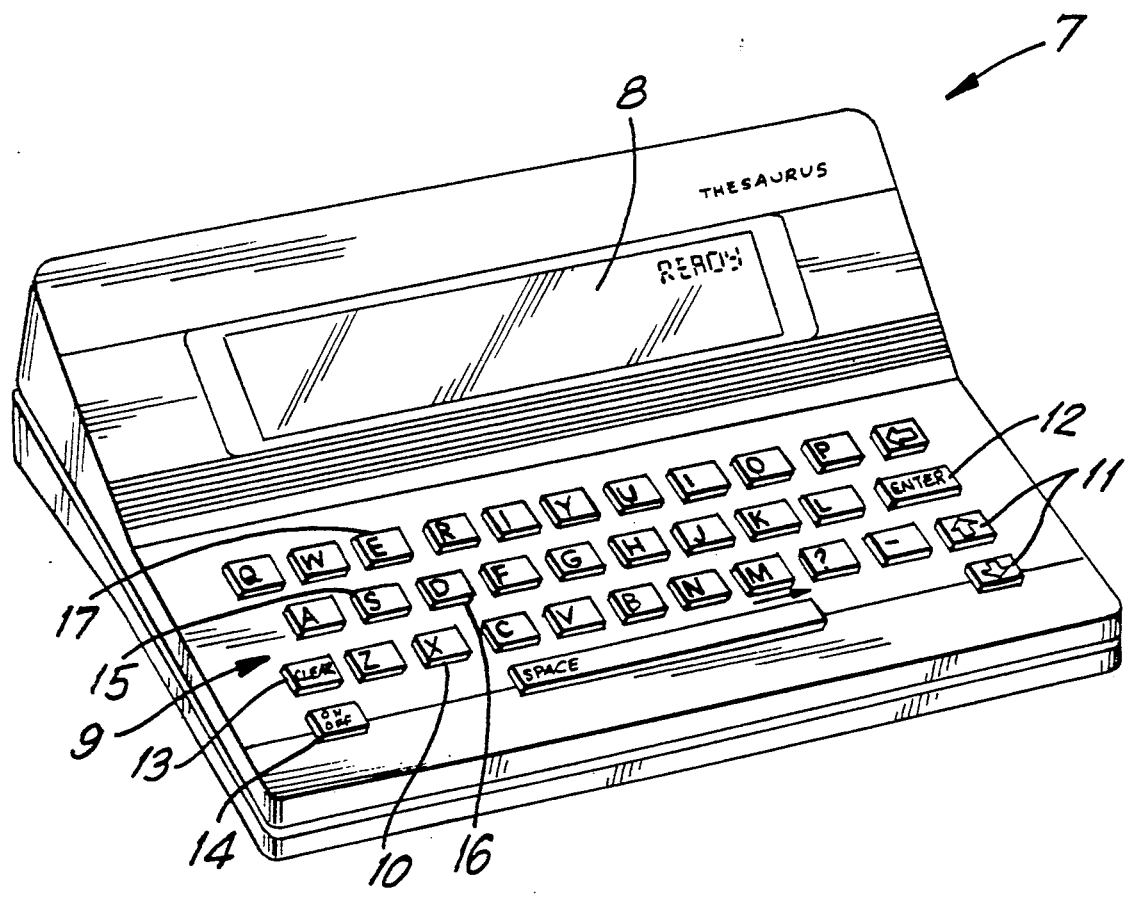
FIG. 1 is a perspective view of a hand held device having a keyboard and a display screen which contains an embodiment of this thesaurus invention.

FIG. 1 is a face view of a thesaurus device 7 embodying this invention in which a display screen 8 displays various characters including those which may be put into a display string by an operator pressing keys on the keyboard 9. Depending on the state of the device 7, pressing individual keys such as the key 10 will put the corresponding character (in that case, the letter "X") on the display screen 11. The keyboard contains keys whose function is best understood after an understanding of the FIG. 2 flow chart. At this point, one might note that there are scroll keys 11. There is an enter key 12 which is used to enter a word on a history list and that commences a series of sub routines described in connection with FIG. 2. Clear key 13 clears the screen 11 as well as the history list and creates a condition comparable to the state when the device is first turned on. An on/off key 14 performs the usual function of turning the power off and on.

For purposes of the following discussion the most critical keys are the S/SYN key 15, the D/DEF key 16 and the E/Edit key 17. In brief, these three keys when pressed at the appropriate time after a word has been entered will provide respectively (a) a set of synonyms for the entered word, which set of synonyms are divided into subsets, (b) a core meaning or definition for each subset of synonyms and (c) an ability to mark or tag any word displayed for the purpose of permitting the user to enter that word in the history list so that it can in turn be processed for its synonyms and definitions.

Other keys on the keyboard 12 perform less significant functions and can best be described in connection with functions performed as shown in connection with FIG. 2.

The flow chart shown in FIG. 2 indicates the major functions of the FIG. 1 embodiment and, in particular, shows the operations and relationships that relate to the edit function. As indicated in FIG. 2, when the thesaurus 10 is turned on, display step 20 provides an opening statement. At function step 22, the lists are all cleared. Display step 24 then shows each character entered by the user on the keyboard 9. When the enter key 12 on the keyboard is pressed, the decision step 28 causes the entry word (that is, the word being displayed) to become the current word as indicated at function step 30. Being the current word means that the entry word is tagged as the latest word in the history list that is maintained in memory.

At the beginning of the processing, the history list is empty and step 30 creates the original entry word in the history list. Function step 30 tags the original entry word so that it is maintained at the head of the history list even after the history list is filled and the earlier additional entry words are dumped by later additional entry words.

The spelling verification step 32 is a known function which is incorporated in a preferred embodiment of this invention. It is not a part of the thesaurus editing function to which this invention is directed and thus need not be described in detail herein. As shown at decision step 34, if the spelling of the string of letters entered is not verified, a list of suggested corrections is developed at function step 36. If there are no spelling corrections found at decision step 38, then the display step 40 (see tag 3) displays the message "sorry can't help" and further display step 42 displays the string of letters entered. The string is an erroneous spelling or at least does not match any word that can be found in memory.

If, however, one or more words with possible correct spellings for the entered string are found, the display step 44 indicates the list size and displays at least the first word of the list of suggested corrections. The user can then scroll through that list and display each word on the list. When the user finds a spelling that the user feels is appropriate, the user can press the enter key and proceed through the process indicated for a word having a spelling verified (see decision step 34).

At display step 48, a verified spelling is displayed and in response to the user pressing the S/SYN key 15 a search is made at function step 50 for appropriately related words, termed herein "thesaurus relations". These thesaurus relations include terms which are generally synonyms but are not necessarily limited to synonyms. They are an appropriate set of terms which relate to the current entry word. These related terms are divided into subsets, as discussed further on. Normally at least one subset is found. If synonyms are found at decision step 52, the display step 54 shows the number of subsets involved and preferably illustrates one or more words of the first subset.

If no synonyms are found at decision step 52, some of the succeeding processing can be undertaken. Thus the outcome at the decision step 52 is, in either case, as indicated at processing step 56, to enable the device to process any one of a number of function keys that may be pressed by the user. FIG. 2 illustrates what happens when particular function keys are pressed by the user and what the interrelationships are between these function keys.

Any one of the decision steps 58 through 82 can be initiated by the user pressing the appropriate function key on the keyboard.

As shown on the FIG. 2 flow chart, decision steps 58 through 72 can be processed in pretty much any arbitrary sequence by the user to provide certain functions and displays. For example if the user presses the C/CURR W key which provides a yes function for the decision step 64, then the screen will display the current word for which entry has been made (display step 64A). This current word is the latest word on the history list.

Similarly if the user presses the O/ORIG key to provide a yes output for decision step 66, the screen will, as indicated at display step 66A, display the earliest word on the history list. Either of these steps can be undertaken at any time after step 56. Yet after display step 64A or display step 66A, any of the other subroutines initiated by decisions steps 58 through 82 (the on/off function) can be initiated by the user. So too, after any of the subroutines represented by 58 (the scroll function) through step 72 (the text marker function), any of the steps 58 through 82 can be initiated by the user.

The completion of any one of the subroutines initiated by one of the steps 58 through 72, results in returning the device to the state at the function step 56, such that any one of the subroutines initiated by decision steps 58 through 82 can be initiated by the operator.

For example, in one embodiment, the entry word TEST will provide a display indication at step 54 of four synonym subsets found. If the user then passes the "S" key, the decision step 60 will result in the functions step 60A and display step 60B selecting and displaying at least the first word of the first subset of synonyms. Assuming there is no text marker activated, the scroll keys initiate decisions at step 58 to move the text as displayed (step 58B) scroll through the list of words in whatever subset is current. Specifically, the words: "experiment", "experimentation", "trial", "trial and error" and "trial run" can be scrolled through if the screen 8 capacity is inadequate to display the entire subset. Since the synonym subset is being displayed, the user presses the key N/Next, and at least the first word of the second subset will be displayed as indicated at step 68A, 68B and 68C. The N/Next key and P/Previous key provide the decision inputs indicated at decision step 68 for stepping from one subset of synonyms to the next subset or previous subset.

Each subset of synonyms is grouped around a single meaning core. This meaning core is in effect a definitional concept for the group of words in the subset. For example in the subset of five word which constitutes the first of four subsets for the entry word TEST, the meaning core is "noun", an operation or process carried out to resolve an uncertainty". When any of the words of that first subset is displayed and the operator presses the D/Def Key, that meaning core will be displayed as indicated by the process step 62A and display step 62B. The scroll keys 11 can be used to scroll through that meaning core.

Each subset of words (these being four subsets associated with the entry word TEST) has its own separate meaning core. The keys N/Next and P/Previous if pressed while a meaning core is being displayed will cause the immediate next or previous meaning core to be prepared and displayed as indicated at decision boxes 69A, processing step 69B and display step 69C.

It should be noted that with respect to the subsets of synonyms, the members of a subset share a single meaning core and that normally speaking each subset has a different meaning core.

As indicated at display steps 54, 60B and 62B, the words located by the associated search functions 50, 60A and 62A respectively are made available for display. Where the list of words or the definitions involved is more than can be shown on the screen 8 at any one time, only the initial portion of the set of words and definitions will be so displayed. Decision step 58 indicates scrolling steps using keys 11 which can be taken to either (a) scroll through a list, any one of whose members are being displayed or (b) to scroll through a definition, any part of which is being displayed The Current Entry Word is the word for which definitions and synonyms are available by pressing the D/DEF key and S/SYN key respectively. For a displayed word to become the Current Entry Word, the Enter key 12 is pressed. Each Current Word that is entered is kept in the history list up to the capacity of the history list. The Words in the history list are not erased unless the clear key (or off key) is pressed.

The first entry word is the Original Entry Word. It is the first word entered after the clear button is pressed or after the device is turned on The Original Entry Word is the first or top word in the history list.

In one preferred routine, the Original Entry Word is always retained in the history list even if the capacity of the machine is exceeded. If the user keeps adding Current Words, without clearing the history word list, to the point where the machine's capacity is exceeded, the earliest Current Words, except for the Original Word, are deleted. But the Original Current Word is retained.

A word is added to the history list as an Additional Entry Word if any one of the following three steps is taken:

1. The enter key is pressed while one of the synonym words from any one of the subsets is being displayed.

2. The enter key is pressed after the text marker is moved to the first letter of the word to be added to the history list. The text marker is activated by pressing the Edit key.

3. The enter key is pressed after a quick enter word has been set forth by the operator on the screen. The quick enter word may be set forth only after the Q key has been pressed.

In each of the above three cases, an addition to the word list will be made and will be maintained as long as the clear key is not pressed. Once the clear key is pressed, the word history list is deleted. The original entry word remains at the head of the list during any of the above processing.

To view the history list, which is the list of all entered words, the user can press the V/VIEW key thereby providing a "yes" for the decision step 70. Processing step 70A prepares the history list for display as indicated at display step 70B. The user can then scroll through the history list that is displayed to view those terms which the user has found most apt. In a preferred embodiment, the user can press the T/Top key or B/Bottom key to access the first member (which is the original entry word) or the most recent, current entry word.

A most important and useful edit function is provided by the "E" key. When the E/Edit key is pressed thereby providing an affirmative at decision step 72, a text marker is prepared by processing step 72B and displayed as the first letter of the first word in the display screen. The scrolling key can move the text marker to any position on the display screen. If the test marker is placed over the first letter of any word on the display screen and the enter key is then pressed, that word will be added to the history list.

However, if as indicated at decision step 72A, the test marker is already present (meaning that the "E" key has been pressed once), then pressing the E/Edit key a second time will cause a further editing function to be initiated. The further editing function permits the user to revise the word displayed. The letters can be deleted by pressing the delete key and letters can be added by pressing the appropriate letter key. When the user has developed a desired revised word, it is displayed as indicated at display step 24 and pressing the enter key 12 will initiate the sequence of steps consequent to the yes function from the decision step 28.

A third mode for adding words to the history list is conveniently provided by the "Q" key, which when pressed provides the subroutine associated with a positive response to the decision step 78. This permits the user to enter any display string or word and by pressing the enter key initiate the sequence of routines following from the positive output of the decision step 28.

The device of this invention can be in any one of a number of states. The states relevant to this invention include the following:

1. The state where a word has been entered.

2. The state where a set of synonyms divided into subsets has been prepared (the S key pressed after the Enter key).

3. The core meaning presentation state in which the core meaning for each of the subsets of synonyms is available. (the D key pressed while a synonym is being displayed).

4. The word presentation state; a state just prior to the entry of a word. This word presentation state may be generated by pressing the Enter key under any one of four conditions; namely (a) the initial presentation of a word through the keyboard, (b) the presentation on the keyboard of a word from the set of synonyms, (c) the designation of a word in one of the core meanings or list of words in a subset of synonym by placing an appropriate marker at the first letter of the word; and (d) input of a word through the "Q" key from the keyboard.

5. The state of presenting the history list.

6. The state of scrolling. The history list can be scrolled through with the scroll keys 11. Each meaning core synonym subset can also be scrolled through if the display screen is not large enough to display the entire item.

As indicated in the flow chart FIG. 2, the user can fairly readily switch from any one state to any other state at any point in time by pressing the appropriate key on the keyboard.

In one embodiment, the synonyms provided, the division of the synonyms into subsets and the meaning core provided for each subset are selected from Webster's School of Thesaurus, a Merriam-Webster Publication (1978) by Merriam-Webster, Inc. ISBN 0-87779-178-3.

Attached hereto as appendix A is a presently preferred listing in "C" source code of those routines and processes which ar pertinent to this invention. This listing includes the top level controls for operating the edit and history list functions of this electronic thesaurus. A skilled programmer may implement the invention by means of a different code listing.

With respect to the file listings in appendix A, the following files might be noted. The file PtHi.Def—Human Interface and the file PtHi.C—Human Interface provide for the editing functions including indicating when words are put in the history buffer and also shows the process control in response to key strokes and device states. The file thes.h merely include certain file constants. The files thes.c and thesenv.c are the main top level codes for selecting synonyms and pulling out meaning cores. The thesenv.c file sets up the initial parameters for the thes.c code processing.

The files inflect.c and unflect.c handle the inflected and uninflected forms of words thereby keeping tenses consistent. These codes are not part of the invention as claimed but are included to provide a presently preferred disclosure of how this portion of the processing of the words is handled.

There are a number of straight forward subservient routines which are not shown, such as the scroll codes, which one skilled in the art could readily implement. Furthermore, it should be understood that the particular technique of taking words from the data base is a function of the date base employed. Since the data base employed is not as such a part of the invention claimed the codes for interfacing the particular data base employed in an embodiment of this invention are not shown. One skilled in the art would know how to provide an appropriate process for interfacing with whatever data base is employed.

In addition, it might be noted that commercial embodiments of this invention are likely to include many other functions such as games, hyphenation and spelling correction, all of which involve routines and processing separate from the editing functions and word list build up which is the focal point of this invention.

```
PtHi.Def                         1    1
PtHi.Def                         1    52

1       /*
2       File:    PtHi.Def -- Human Interface
3       Author:  P. Squillante
4       Date:    November 18, 1987
5       Content: Definitions for Speller-Thesaurus Human Interface code for Franklin
6                Pocket Thesaurus.
7       Notes:
8       */
9
10      #ifdef PtHi_Module
11      #    define EXPORT
12      #else
13      #    define EXPORT extern
14      #endif
15
16                              /* Exported Constants */
17              /* Screen State Definitions */
18      #define NoSpell     0
19      #define OkSpell     1
20      #define ThesDef     2
21      #define CandLst     3
22      #define SynLst      4
23      #define HyphWrd     5
24      #define BuildState  6
25      #define ViewWords   7
26      #define HuntWord    9
27      #define CurrWord    10
28
29
30                              /* Exported Variables */
31      EXPORT char msg_buf[MAX_WORD + BUF_TERM_SIZE];  /* Maximum word length + buffer terminators */
32      EXPORT char word_buf[MAX_WORD + BUF_TERM_SIZE];
33      EXPORT BYTE word_size;            /* Current input string size */
34      EXPORT BYTE ScrnState;            /* Curr State: NoSpell, OkSpell, ThesDef, CandLst, SynLst, HyphWrd. */
35      EXPORT BYTE sys_clear;  /* assorted boolean flags */
36      EXPORT char *actv_message;    /* active message */
37
38                              /* Exported Macros */
39
40                              /* Exported Function Protoypes */
41
42      #ifndef PtHi_Module
43      /*****************************************************************\
44      *  sthimain - Speller Thesaurus Human Interface main procedure.   *
45      *  Notes: None.                                                   *
46      \*****************************************************************/
47      #endif
48
49      . EXPORT void sthimain(void);
50
51
52      #undef EXPORT
111     /* the inflection->root (reverse relation) is forward + 1 */
112     /* zero means don't care */
113
114     #define DN_CR    0              /* don't care */
115     #define PR_PX    1              /* present to past or past participle */
116     #define PR_PS    3              /* present to past tense */
117     #define PS_PR    4              /* past to present */
118     #define PR_PP    5              /* present to past participle */
119     #define SI_PL    7              /* singular to plural */
120     #define VB_AJ    9              /* verb to adjective */
121     #define RE_CM    11             /* regular to comparative (adjective) */
122     #define RE_SU    13             /* regular to superlative (adjective) */
123     #define VB_NN    15             /* verb to noun */
124     #define AJ_AV    17             /* adjective to adverb */
125     #define AJ_NN    19             /* adjective to noun */
126     #define TP_SI    21             /* 3rd person singular */
127     #define PR_PC    23             /* present to present continuous */
128     #define SV_PX    25             /* present to past/pp (sp. verbs) */
129     #define SP_PL    27             /* singular to plural (sp. nouns) */
130     #define TP_SP    29             /* third person to second person */
131     #define TP_FP    31             /* third person to first person */
132
133     /* macros to test controls */
134
```

```
135     #define isunf(meanno)  (meanno )= Thes.tq_unfindex[0])
136
137     /* Error codes for the thesaurus */
138
139     #define ERR_DATA        10      /* thesaurus data error */
140     #define ERR_STR         11      /* thesaurus string section error */
141     #define ERR_STATE       12      /* thesaurus --- wrong state error */
142
143     #endif
```

| Thes.C |           |    |      |
|--------|-----------|----|------|
| Thes.C |           | 1  | 1    |
| Thes.C | DBGP      | 1  | 34   |
| Thes.C | DBGP      | 1  | 36   |
| Thes.C | thesopen  | 2  | 74   |
| Thes.C | thesclose | 3  | 134  |
| Thes.C | thesword  | 3  | 145  |
| Thes.C | thsinit   | 6  | 304  |
| Thes.C | thesfetch | 8  | 421  |
| Thes.C | savemean  | 9  | 461  |
| Thes.C | savedir   | 9  | 486  |
| Thes.C | skipmean  | 10 | 534  |
| Thes.C | findcode  | 11 | 568  |
| Thes.C | theshuff  | 12 | 645  |
| Thes.C | binloc    | 14 | 734  |
| Thes.C | getmean   | 14 | 763  |
| Thes.C | thesinfo  | 17 | 914  |
| Thes.C | setqflags | 20 | 1073 |
| Thes.C | nextlist  | 21 | 1134 |
| Thes.C | getstage  | 21 | 1147 |
| Thes.C | badunf    | 22 | 1187 |
| Thes.C | goodpos   | 24 | 1280 |
| Thes.C | isinf     | 24 | 1320 |
| Thes.C | thescntrl | 25 | 1344 |
| Thes.C | delunf    | 25 | 1367 |
| Thes.C |           | 26 | 1380 |

```
1       /**********************************************************************\
2
3           Product Number: SC-50-5.7
4
5           Version: rev5.7
6
7           Product Name: Spelling Components - Thesaurus
8
9           Filename: thes.c
10
11
12          This document contains private and confidential information and
13          its disclosure does not constitute publication.  Some of the
14          information herein also may appear in United States and or
15          Foreign Patents Pending.  All rights are reserved by Proximity
16          Technology Inc., except those specifically granted by license.
17
18      \**********************************************************************/
19
20      #include <proxio.h>
21      #include <lex.h>
22      #include <environ.h>
23      #include <scdef.h>
24      #include "thesmisc.h"
25      #include "thes.h"
26      #include "memory.h"
27      /* #include "defines.h" */
28
29      #ifdef DEBUG
30      extern int debug;
31      #endif
32
33      #ifdef DEBUG
34      #define DBGP(x,y) {if (debug) fprintf(stderr, x, y);}
35      #else
36      #define DBGP(x,y)
37      #endif
38
39      #define INFALT " or "
40
41      #define MAXSTR 256
42      #define HUFFCH 129
43
44      #define MEAN 0
45      #define INIT 1
46      #define DEFS 2
47
48      /* Thes structure provides access to all the thesaurus
49          query informataion and the results of a lookup. */
50
51      LEX     *Theslex;
52
53      #ifdef ROM
54      extern THES JThes;
55      static THES Thes;
56      #else
57      extern /*static*/ THES Thes;
58      #endif
59
60      static UCHAR jtm_strings[556];    /* JULES */
61      static long jtm_hashes[36];       /* JULES 144 bytes but only 36 longs */
62      static UCHAR *jstrarr[41];        /* JULES 164 (82) bytes but only 41 ptrs */
63
64      static long Control;
65      static int Oflag;
```

```
 66      static UCHAR *Unfquery;
 67      static END *Stageptr;
 68
 69      /* Read in the thesaurus bin tables and the overflow tables
 70         which are length prepended table of short values. Allocate
 71         space for the strings and the hashes. Also, determine the
 72         offset to the start of the meaning bins. */
 73
 74      thesopen(lexptr)
 75      register LEX    *lexptr;
 76   1  {
 77   1      long    binloc();
 78   1      long    thesbit();
 79   1      VOID    thesclose();
 80   1
 81   1      register int i;
 82   1      HANDLE  fptr;
 83   1      int     tabsize;
 84   1      int     maxhash;
 85   1      long    offset;
 86   1      long    unfoff;
 87   1
 88   1
 89   1      /* JULES copy over ROM initialized structure to RAM structure */
 90   1      #ifdef ROM
 91   1          move((char *) &Thes, (char *) &JThes, sizeof(THES)); /* JULES */
 92   1      #endif
 93   1      Thes.tm_strings = jtm_strings;
 94   1      Thes.tm_sentinel = jtm_strings + Thes.th_strsiz + Thes.th_maxdef;
 95   1      Thes.tm_hashes = jtm_hashes;
 96   1      Thes.tm_strarr = jstrarr;
 97   1
 98   1      /* Check if the lexicon has thesaurus information. */
 99   1
100   1      offset = (long)(lexptr->lx_offset + lexptr->lx_nindex) * MM_BLKSIZE;
101   1      fptr = lexptr->lx_file;
102   1      Theslex = lexptr;
103   1
104   1      /* Read in the unflection exceptions. */
105   1
106   2      if (!(unfoff = unfopen(fptr))) {
107   2          Scerror = ERR_THES | ERR_ALLOC;
108   2          thesclose();
109   2          return (FALSE);
110   1      }
111   1      offset += unfoff;
112   1
113   1      tabsize = Thes.th_lcode * sizeof(USHORT);
114   1
115   1      tabsize = Thes.th_nchars;
116   1
117   1      offset += THESHEAD * sizeof(short) + Thes.th_lcode + Thes.th_nchars
118   1          + 2 * (Thes.th_nibin + Thes.th_niadd
119   1          + Thes.th_nmbin + Thes.th_nmadd);
120   1
121   1      maxhash = Thes.th_maxhash + 1;
122   1
123   1      /* Allocate space for the strings, the pointers
124   1         to the strings and the hash table. */
125   1
126   1      Control = TH_ALLPOS | TH_ALLLIST | TH_INFSYN;
127   1      Thes.tq_state = TH_INIT;
128   1      return (TRUE);
129      }
130
131      /* Close an open thesaurus. */
132
133      VOID
134      thesclose()
135   1  {
136   1      unfclose();
137      }
138
139      /* Thesword() is the main interface to the thesaurus function.
140         This function gathers information for "nummean" meanings
141         starting from the meaning number "start" and fills the
142         array "defs" with the definitions. The returned value
143         is the number of meanings actually retrieved. */
144
145      thesword(query, start, nummean)
146      register char   *query;
147      int     start;
148      int     nummean;
149   1  {
150   1      long    theswtch();
151   1
152   1      register UCHAR *strptr;
153   1      HANDLE  fptr;
154   1      static  int index;
155   1      int     allpos;
156   1      short   meanreq;
157   1      UCHAR   tmpstr[LONGWORD];
158   1
159   2      if (strlen(query) >= MAXWORD) {
160   2          return (FALSE);
161   1      }
162   1      meanreq = nummean;
163   1
164   2      if ((Oflag = doflags((UCHAR *)query, tmpstr, MAXWORD)) == ERROR) {
165   2          Scerror = ERR_THES | ERR_WLEN;
166   2          return (FALSE);
167   1      }
168   1
169   1      /* Decrement start since internal meaning numbers start from 0. */
```

```
170  1
171  1      --start;
172  1
173  1      /* If the flagged form of the query does not match Thes.tq_query,
174  1         the Thes structure has to be initialized. */
175  1
176  2      if (strucmp(tmpstr, Thes.tq_query) != 0) {
177  2          strecpy(Thes.tq_query, tmpstr);
178  2          Thes.tq_state = TH_INIT;
179  2          Thes.tq_special = Qflag & IW_SPECIAL;
180  2      } else if (start > Thes.tq_count) {
181  2          return (ERROR);
182  2      } else if (Thes.tq_state != TH_INIT) {
183  2          nummean -= (Thes.tq_count - start);
184  2          if (nummean < 0) nummean = 0;
185  1      }
186  1
187  2      switch (Thes.tq_state) {
188  2          case TH_INIT:
189  3              if (!thsinit((UCHAR *)query, &allpos)) {
190  3                  return (FALSE);
191  2              }
192  2
193  2          case TH_MORE:
194  2              savemean(0, &nummean);
195  2
196  3              if (Thes.tq_state == TH_DONE || nummean == 0) {
197  3                  return (meanreq - nummean);
198  3              } else {
199  3                  Thes.tq_unfindex[0] = Thes.tq_count;
200  3                  Thes.tq_state = TH_UNFL;
201  2              }
202  2
203  2      /* Try the unflected form of the word. */
204  2
205  2              strecpy(Thes.tq_unfquery, Thes.tq_query);
206  2              if (!unflect(Thes.tq_unfquery,Thes.tq_multunf,Thes.tq_stage)){
207  3                  Thes.tq_state = TH_DONE;
208  3                  return (meanreq - nummean);
209  2              }
210  2
211  2              if (Thes.tq_special
212  2                  && Thes.tq_phrase
213  3                  && doflags(Thes.tq_unfquery, tmpstr, MAXWORD) != ERROR) {
214  3                  strecpy(Thes.tq_unfquery, tmpstr);
215  3                  Thes.tq_multunf[1] = NULL;
216  2              }
217  2
218  2              index = 0;
219  2              Stageptr = Thes.tq_stage[index];
220  2
221  2  /**************************************************************
222  2   *   Remove incorrect (or unwanted) unflections.               *
223  2   *   An unflected form is to be discarded if:                  *
224  2   *       1. it is not in the lexicon (an unlikely occurence).  *
225  2   *       2. the type of unflection is not desired.             *
226  2   *       3. it has no meanings in the thesaurus.               *
227  2   **************************************************************/
228  2
229  3              while ((Unfquery = Thes.tq_multunf[index]) != NULL) {
230  3                  Thes.tq_unfpos[index] = Stageptr->en_pos;
231  3                  if ((Thes.tq_worddesc[index]
232  3                          = theswtoh((char *)Unfquery, Theslex)) < 0
233  3                          || badunf(index, allpos)
234  4                          || thesfetch(Thes.tq_worddesc[index]) == 0) {
235  4                      delunf(index);
236  4                  } else {
237  4                      Thes.tq_numdesc[++index] = Thes.tq_endtab;
238  3                  }
239  3                  Stageptr = Thes.tq_stage[index];
240  2              }
241  2
242  2      /* If the word is a phrase & a special, Thes.tq_unfquery must
243  2         be cleaned up to remove the flagged form.
244  2         */
245  2
246  3              if (Thes.tq_phrase && Thes.tq_special) {
247  3                  strptr = Thes.tq_unfquery;
248  4                  while (*strptr) {
249  5                      if (*strptr++ < ' ') {
250  5                          strecpy(tmpstr, strptr);
251  5                          strecpy(Thes.tq_unfquery, tmpstr);
252  5                          break;
253  4                      }
254  3                  }
255  2              }
256  2              index = 0;
257  2              Unfquery = Thes.tq_multunf[index];
258  2
259  2          case TH_UNFL:
260  3              while ((Stageptr = Thes.tq_stage[index]) != NULL) {
261  4                  if (Thes.tq_count > Thes.tq_unfindex[0]) {
262  5                      switch (Stageptr->en_rel) {
263  5                          case VB_NN:
264  5                          case AJ_AV:
265  6                              if (index > 0) {
266  6                                  delunf(index);
267  6                                  continue;
268  5                              }
269  5                          default:
270  5                              break;
271  4                      }
272  3                  }
273  3
274  3                  Thes.tq_control &= ~TH_ALLPOS;
275  3                  Thes.tq_control |= Thes.tq_unfpos[index];
```

```
276  3
277  3                    savemean(index + 1, &nummean);
278  3
279  4                    if (Thes.tq_state == TH_DONE) {
280  4                        return (meanreq - nummean);
281  4                    } else if (!nummean) {
282  4                        return (meanreq);
283  3                    }
284  3
285  3            /* If no meanings are found for an unflected form, remove it. */
286  3
287  4                    if (Thes.tq_unfindex[index] == Thes.tq_count) {
288  4                        delunf(index);
289  4                    } else {
290  4                        Thes.tq_unfindex[++index] = Thes.tq_count;
291  3                    }
292  2                }
293  2                Thes.tq_state = TH_DONE;
294  2
295  2            case TH_DONE:
296  2                return (meanreq - nummean);
297  2            default:
298  2                break;
299  1        }
300  1        return (FALSE);
301       }
302
303
304       thsinit(query, allpos)
305       UCHAR    *query;
306       int      *allpos;
307  1    {
308  1        long     theswtoh();
309  1        UCHAR    *strecpy();
310  1
311  1        register UCHAR *strptr;
312  1        register int   i;
313  1        UCHAR    *start;
314  1        UCHAR    tmpstr[LONGWORD];
315  1
316  1        DBGP("thesword(%s)\n",query);
317  1
318  2        if (!(*allpos = (Control & TH_ALLPOS) == TH_ALLPOS)) {
319  3            if (Control & TH_VERB) {
320  3                Control |= TH_VERBAUX | TH_VERBSP;
321  2            }
322  3            if (Control & TH_NOUN) {
323  3                Control |= TH_PLNOUN | TH_SPNOUN;
324  2            }
325  3            if (Control & TH_ADJ) {
326  3                Control |= TH_ADJSP;
327  2            }
328  1        }
329  1
330  1        /* Save controls. */
331  1
332  1        Thes.tq_control = Control;
333  1
334  1        /* Initialize all values. */
335  1
336  1        Stageptr = NULL;
337  2        for (i = MAXUNF; --i )= 0;) {
338  2            Thes.tq_unfpos[i]    = NPOS;
339  2            Thes.tq_unfindex[i]  = MAXMEAN;
340  2            Thes.tq_numdesc[i]   = MAXMEAN;
341  2            Thes.tq_worddesc[i]  = ERROR;
342  2            Thes.tq_stage[i]     = NULL;
343  2            Thes.tq_multunf[i]   = NULL;
344  1        }
345  1        Unfquery = NULL;
346  1        Thes.tq_count = 0;
347  1        Thes.tq_unfquery[0] = '\0';
348  1        Thes.tq_tblind = 0;
349  1        Thes.tq_endtab = 0;
350  1        Thes.tq_phrase = FALSE;
351  2        for (i = Thes.tq_nstrarr; --i )= 0;) {
352  2            Thes.tm_strarr[i] = NULL;
353  1        }
354  1
355  1        /* Obtain the hash value for the query word. */
356  1
357  2        if ((Thes.tq_desc = theswtoh((char *)Thes.tq_query, Theslex)) < 0) {
358  2
359  2            /* If the query is an inflected phrase, check
360  2               the component words for validity. */
361  2
362  3            if (Thes.tq_special) {
363  3                strptr = strecpy(Thes.tq_query, query) - 1;
364  4                if (*strptr == '.') {
365  4                    *strptr = '\0';
366  3                }
367  2            }
368  2            start = Thes.tq_query;
369  3            do {
370  3                strptr = start;
371  4                while (*strptr && *strptr != ' ') {
372  4                    ++strptr;
373  3                }
374  4                if (*strptr == ' ') {
375  4                    Thes.tq_phrase = TRUE;
376  3                }
377  4                if (*strptr == '\0') {
378  4                    doflags(start, tmpstr, MAXWORD);
```

```
379  4                          if (!Thes.tq_phrase
380  5                              || theswtoh((char *)tmpstr, Theslex) < 0){
381  5                              return (FALSE);
382  4                          }
383  4                      } else {
384  4                          *strptr = '\0';
385  4                          doflags(start, tmpstr, MAXWORD);
386  5                          if (theswtoh((char *)tmpstr, Theslex) < 0) {
387  5                              return (FALSE);
388  4                          }
389  4                          *strptr = ' ';
390  4                          start = strptr + 1;
391  3                      }
392  2                  } while (*strptr);
393  1              }
394  1
395  1              /* At this stage, an acceptable query must either be a valid
396  1                 phrase or a word in the lexicon. If neither, return failure. */
397  1
398  2              if (Thes.tq_desc < 0 && !Thes.tq_phrase) {
399  2                  return (FALSE);
400  1              }
401  1
402  1              /* Seek to start of thesaurus info for the
403  1                 word and get the indirect pointers. */
404  1
405  2              if (Thes.tq_phrase && Thes.tq_desc < 0) {
406  2                  Thes.tq_numdesc[0] = 0;
407  2              } else {
408  2                  Thes.tq_numdesc[0] = thesfetch(Thes.tq_desc);
409  1              }
410  1
411  1              /* Set the thesaurus state to indicate the
412  1                 presence of information for the query. */
413  1
414  1              Thes.tq_state = TH_MORE;
415  1              return (TRUE);
416          }
417
418          /* Given a word descriptor, fetch all its meaning descriptors. */
419
420
421          thesfetch(worddesc)
422          long    worddesc;
423  1      {
424  1          long    binloc();
425  1
426  1          HANDLE  fptr;
427  1          long    binend;
428  1          long    binstart;
429  1          int     binid;
430  1
431  1          fptr = Theslex->lx_file;
432  1
433  1          /* Figure out where bin starts and how long it is. */
434  1
435  1          binid = binnum(worddesc);
436  1          binstart = binloc(binid, Thes.th_idata, Thes.th_ibin,
437  1              Thes.th_iadd, Thes.th_niadd);
438  1          binend = binloc(binid + 1, Thes.th_idata, Thes.th_ibin,
439  1              Thes.th_iadd, Thes.th_niadd);
440  1
441  1          /* If bin length is zero, the query word can't be in it. */
442  1
443  2          if (binend == binstart) {
444  2              return (FALSE);
445  1          }
446  1          /* Seek to the start of bin. */
447  1
448  1          thesblk(fptr, binstart, 1);
449  1
450  1          /* Decompress the bin until the search
451  1             key for this worddesc is found. */
452  1
453  1          return (findcode(fptr, (int) codeval(worddesc),
454  1              (int) (binend - binstart)));
455          }
456
457          /* Save the addresses of the meaning descriptors that are valid
458             for the query and fill the "defs" array with the definitions. */
459
460
461          savemean(inddesc, nummean)
462          int     inddesc;
463          int     *nummean;
464  1      {
465  1          register int    numsaved;
466  1
467  1          numsaved = 0;
468  2          while (Thes.tq_tblind < Thes.tq_numdesc[inddesc] && *nummean) {
469  2              if (savedir(Thes.tq_indtab[Thes.tq_tblind++],
470  3                  (int)Thes.tq_count)) {
471  3                  Thes.tq_addr[Thes.tq_count++] = Thes.tq_curaddr;
472  3                  --(*nummean);
473  3                  ++numsaved;
474  2              }
475  3              if (Thes.tq_count >= MAXMEAN) {
476  3                  Thes.tq_state = TH_DONE;
477  3                  break;
478  2              }
479  1          }
480  1          return (numsaved);
481         }
482
```

```
483     /* Save all the hashes that correspond to an indirect table entry */
484
485
486     savedir(inddesc, meanno)
487     register int    inddesc;
488     int     meanno;
489 1   {
490 1       long    binloc();
491 1
492 1       register long addr;
493 1       HANDLE  fptr;
494 1       int     listnib;
495 1       int     mbinid;
496 1       int     meanid;
497 1       long    mbinstart;
498 1
499 1       fptr = Theslex->lx_file;
500 1
501 1       /* Locate the bin that contains the desired meaning. */
502 1
503 1       mbinid = meanbin(inddesc);
504 1       meanid = meannum(inddesc);
505 1       mbinstart = binloc(mbinid, Thes.th_mdata, Thes.th_mbin,
506 1           Thes.th_madd, Thes.th_nmadd);
507 1
508 1       /* Skip meanings until the desired meaning is reached. */
509 1
510 1       thesblk(fptr, mbinstart, 1);
511 1       addr = mbinstart * 8;
512 2       while (--meanid >= 0) {
513 2           listnib = (int) thesbit(fptr, Thes.th_posfld) & LISTBITS;
514 2           addr += Thes.th_posfld;
515 2           addr += skipmean(listnib, fptr);
516 1       }
517 1
518 1       /* Save the address of the start of the meaning. If this
519 1          meaning is acceptable, the address will be stored in
520 1          the field tq_addr[] (of the Thes structure). */
521 1
522 1       Thes.tq_curaddr = addr;
523 1       getmean(fptr, meanno, (char *) 0, INIT);
524 2       if (!goodpos((int)Thes.tm_pos) && !thpostst(Thes.tm_pos)) {
525 2           return (FALSE);
526 1       }
527 1       return (TRUE);
528     }
529
530     /* Skip to the end of a meaning. The returned value
531        is the number of bits that were skipped. */
532
533
534     skipmean(listnib, fptr)
535     int     listnib;
536     HANDLE  fptr;
537 1   {
538 1       register int offset;
539 1       register int listcnt;
540 1       register int skipcount;
541 1       int     listno;
542 1
543 1       skipcount = 0;
544 1       offset = 0;
545 1       listno = 0;
546 2       do {
547 3           do {
548 3               listcnt = thesbit(fptr, LISTFLD);
549 3               offset += LISTFLD;
550 3               skipcount += listcnt;
551 2           } while (listcnt == LISTMAX);
552 1       } while ((listno = nextlist(listno, listnib)) < MAXLISTS);
553 1
554 1       skipcount *= Thes.th_dirfld;
555 1       skipcount += (int) thesbit(fptr, 8) * 8;
556 1       offset += 8 + skipcount;
557 1       thesskip(fptr, skipcount);
558 1       return (offset);
559     }
560
561     /* Given the search key byte, determine from the bin header the number
562        of records to be skipped. No meanings are available if the bit
563        corresponding to "code" is not set (in the header). If the presence
564        of meanings is indicated, get all the meaning pointers. */
565
566     extern int      Bitsleft;
567
568     findcode(fptr, code, binlen)
569     HANDLE  fptr;
570     register int    code;
571     register int    binlen;
572 1   {
573 1       register char   cdmask;
574 1       register int    skip;
575 1       long    l1;
576 1       int     i1;
577 1       int     inddesc;
578 1       int     todo;
579 1       int     endtab;
580 1
581 1       todo = IBINHDR;
582 1       skip = 0;
583 1       endtab = Thes.tq_endtab;
584 1       binlen *= 8;
585 2       while (TRUE) {
```

```
586   2            cdmask = (unsigned) thesbit(fptr, 8);
587   2            --todo;
588   3            if ((code -= 8) < 0) {
589   3                code += 8;
590   3                break;
591   2            }
592   3            do {
593   4                if (0x80 & cdmask) {
594   4                    ++skip;
595   3                }
596   2            } while (cdmask <<= 1);
597   1        }
598   2        while (--code >= 0) {
599   3            if (0x80 & cdmask) {
600   3                ++skip;
601   2            }
602   2            cdmask <<= 1;
603   1        }
604   1
605   2        if (!(0x80 & cdmask)) {
606   2            return (FALSE);
607   1        }
608   1
609   1        thesskip(fptr, todo << 3);
610   1
611   2        while (--skip >= 0) {
612   3            do {
613   4                if ((binlen -= INDFLD) < 0) {
614   4                    return (FALSE);
615   3                }
616   3                i1 = thesbit(fptr, INDFLD);
617   3                i1 = eofind(i1);
618   2            } while (!i1); /*eofind(thesbit(fptr, INDFLD)));*/
619   1        }
620   2        while (TRUE) {
621   2            Thes.tq_indtab[endtab++] = inddesc
622   2                = (int) thesbit(fptr, INDFLD);
623   3            if (eofind(inddesc)) {
624   3                break;
625   2            }
626   1        }
627   1
628   1        /* Mark end of indirect pointer table. */
629   1
630   1        Thes.tq_indtab[endtab] = ERROR;
631   1
632   1        return (Thes.tq_endtab = endtab);
633       }
634
635       /* Theshuff will use the huffman tables for the thesaurus
636          and decompress the definition string from current file
637          position. Note that the definition is '\0' code terminated,
638          and is not byte aligned on either direction. It however
639          is preceded by the skip byte, which by this stage must
640          have already been passed. */
641
642
643       int ctheshuff;
644
645       theshuff(fptr, start, skipcount)
646       HANDLE  fptr;
647       register char *start;
648       int     skipcount;
649   1   {
650   1        register int scratch;   /* Difference between input and code */
651   1        register int index;     /* Index into translation table     */
652   1        int     bitsleft;       /* Number of bits left in current byte */
653   1        int     currchar;       /* Current input byte being processed */
654   1        int     nextchar;       /* Next input byte to be processed */
655   1        USHORT  *table;
656   1        UCHAR   *xlate;
657   1        char    *str;
658   1        int     newch;
659   1        register int i;
660   1
661   1        /* Initialize the unpacking variables. */
662   1
663   1        ctheshuff++;
664   1        str = start;
665   1        scratch = 0L;
666   1        bitsleft = 0;
667   1        table    = Thes.th_cnttab;
668   1        xlate    = Thes.th_xlate;
669   1        nextchar = thesbit(fptr, 8);
670   1        --skipcount;
671   2        do {
672   2            index = 0;
673   2            scratch &= 0xFF;
674   2
675   2            /* Loop through the entire table, if necessary. */
676   2
677   3            for (i = 0; i < MAXBITS; i++) {
678   3
679   3            /* Assuming we don't match anything of length i,
680   3               add the current table entry to the index. */
681   3
682   3                index += table[i];
683   3
684   3            /* If the current byte is exhausted, fetch another. */
685   3
686   4                if (!bitsleft--) {
687   4                    bitsleft = 7;
688   4                    currchar = nextchar;
```

```
689  5               if (--skipcount ) = 0) {
690  5                   nextchar = thesbit(fptr, 8);
691  4               }
692  4               scratch |= currchar;
693  3           }
694  3
695  3           /* Shift the next bit in. If we have received
696  3              a code of length i, scratch will be less than
697  3              the current table entry, and will correspond
698  3              to code number table[i] - scratch of length i. */
699  3
700  3               scratch <<= 1;
701  3               scratch -= table[i];
702  3
703  3           /* If scratch is less than zero, we have received
704  3              code number - scratch of length i. Adding that
705  3              to index should give us the absolute index into
706  3              the translate table. */
707  3
708  4               if (scratch < 0L) {
709  4                   index += (int) scratch;
710  4                   break;
711  3               }
712  2           }
713  2           newch = ctoi(xlate[(index )) 8) & 0xFF]);
714  3           if (newch < HUFFCH) {
715  3               *str = newch;
716  3           } else {
717  4               if (str != start && *(str - 1) != ' ') {
718  4                   *str++ = ' ';
719  3               }
720  3               str = (char *) strcpy((UCHAR *)str,
721  3                   Thes.th_huffind[newch - HUFFCH]);
722  3               *str = ' ';
723  2           }
724  1       } while (*str++ != '\0');
725  1
726  2       if (*(str -= 2) == ' ') {
727  2           *str = '\0';
728  1       }
729  }
730
731      /* Given a thesaurus bin, return its byte location in the thesaurus file. */
732
733      long
734      binloc(binid, offset, table, addt, naddt)
735      register int    binid;
736      USHORT  *table;
737      USHORT  *addt;
738      int     naddt;
739      long    offset;
740  1   {
741  1       USHORT  *lastentry;
742  1
743  1       /* Add overflow for this bin number. */
744  1
745  1       lastentry = addt + naddt;
746  2       while (addt < lastentry && binid >= *addt++) {
747  2           offset += OVERFLOW;
748  1       }
749  1
750  1       DBGP("offset=%x ", offset);
751  1       DBGP("table[%d]=", binid);
752  1       DBGP("%x\n", table[binind]);
753  1
754  1       /* Return the bin index value. */
755  1
756  1       return (offset + (long) table[binid]);
757      }
758
759      /* Fetch the information pertaining to a meaning. If skip
760         is TRUE, only the definition will be fetched. */
761
762
763      getmean(fptr, meanno, defstr, skip)
764      HANDLE  fptr;
765      int     meanno;
766      UCHAR   *defstr;
767      int     skip;
768  1   {
769  1       register int    listno;
770  1       register int    listcnt;
771  1       int     unfmean;
772  1       int     ind;
773  1       int     listnib;
774  1       int     totcount;
775  1       int     huffskip;
776  1       int     skipcount;
777  1       int     offset;
778  1       int     strcnt;
779  1       int     hashcnt;
780  1       long    blkaddr;
781  1       long    worddesc;
782  1       long    hash;
783  1       UCHAR   unfstr[MAXSTR * 2];
784  1
785  1       /* Initialize all the counts. */
786  1
787  1       hashcnt = strcnt = 0;
788  1       ind = 0;
789  1       skipcount = 0;
790  1       unfmean = FALSE;
791  1
792  1       /* Determine the word descriptor for which it is a meaning. */
```

```
793  1        while (ind < MAXUNF) {
794  2            if (meanno < Thes.tq_unfindex[ind++]) {
795  3                break;
796  3            }
797  2        }
798  1    }
799  1
800  1    ind -= 2;
801  2    if (ind < 0) {
802  2        worddesc = Thes.tq_desc;
803  2    } else {
804  2        unfmean = TRUE;
805  2        worddesc = Thes.tq_worddesc[ind];
806  1    }
807  1
808  2    if (skip != INIT) {
809  2        blkaddr = Thes.tq_addr[meanno];
810  2        offset  = blkaddr & 0x7;
811  2        blkaddr ))= 3;
812  2        thesblk(fptr, blkaddr, 1);
813  2        thesbit(fptr, offset);
814  1    }
815  1
816  1    Thes.tm_pos = (int) thesbit(fptr, Thes.th_posfld);
817  1    listnib = Thes.tm_pos & LISTBITS;
818  1    Thes.tm_pos &= POSBITS;
819  1    Thes.tm_meanno = meanno;
820  2    for (listno = 0; listno < MAXLISTS; listno++) {
821  2        Thes.tm_count[listno] = 0;
822  1    }
823  1
824  1    listno = 0;
825  2    do {
```

| | | | |
|---|---|---|---|
| PTHI.C | | 1 | 1 |
| PTHI.C | build_msg | 3 | 115 |
| PTHI.C | do_it_all | 3 | 145 |
| PTHI.C | PtHimain | 9 | 490 |
| PTHI.C | | 12 | 616 |

```
 1   /*
 2   File:    PtHi.C -- Human Interface
 3   Author:  P. Squillante
 4   Date:    November 18, 1987
 5   Content: C source code for Franklin Pocket Thesaurus human interface.
 6   Notes:
 7   */
 8
 9   #define PtHi_Module
10
11   /*********************************************************************\
12   *                  Implementations of                                 *
13   *             Speller-Thesaurus Human Interface                       *
14   *                    PS 11/18/87                                      *
15   \*********************************************************************/
16
17         /* Function Trace and Debug statement control flags. These flags */
18         /* must appear before Common.h include file to be effective     */
19   /* #define TraceOn */              /* Enable Trace Macro */
20   /* #define Debug */                /* Enable Debug macro */
21
22                      /* Imported Definitions */
23   #include "Common.h"
24   #include <ctype.h>
25   #include <string.h>
26
27   extern BYTE rep_map[];                      /* Kbd repeat map */
28
29   #include "Key.Def"
30   #include "LCD.Def"
31   #include "Console.Def"
32   #include "Scroll.Def"
33   #include "Timer.Def"
34   #include "SpellIfc.Def"
35   #include "ThesIfc.Def"
36   #include "SahIfc.Def"
37   #include "StrSav.Def"
38
39                      /* Exported Definitions */
40   #include "PtHi.Def"
41
42                      /* Local Constants */
43   #define FIRST   'F'   /* First syn or def */
44   #define LAST    'L'   /* Last syn or def */
45
46   #define RemindTime 40*TicksPerSec  /* 100 systicks a 10ms per tick yields a minimum message time of 1 sec. */
47
48           /* Mode Keys */
49   #define HyphMode     'H'
50   #define SynMode      'S'
51   #define DefMode      'D'
52   #define OrigMode     'O'
53   #define EditMode     'E'
54   #define CurrMode     'C'
55   #define ViewMode     'V'
56   #define WhereMode    'W'
57   #define QuickMode    'Q'    /* Enter a totally new word w/o clearing */
58
59                      /* Buffer Sizes */
60   #define SYN_BUF_SIZE      300    /* BUF_TERM_SIZE less than an even number of paragraphs */
```

```
 61      #define TDEF_BUF_SIZE      190     /* MAXEXP: 180  (See thes.h) + 10 (some for def marker) */
 62
 63                          /* Local Variables */
 64          /* Display Data Buffers */
 65   1  typedef union sharedbuf {
 66   1      char hyph_buf[(2*MAX_WORD + BUF_TERM_SIZE)];
 67   1      char syn_buf[SYN_BUF_SIZE + BUF_TERM_SIZE];
 68   1      char tdef_buf[TDEF_BUF_SIZE + BUF_TERM_SIZE];
 69      } SharedBuffer, *SharedBufferPtr;
 70      VAR_STATIC SharedBuffer sb;
 71
 72          /* Messages */
 73      VAR_STATIC char READONLY query_word_str[] =    { "Original Word" };
 74      VAR_STATIC char READONLY curr_word_str[] =     { "Current Word" };
 75      VAR_STATIC char READONLY enter_edit_word_str[] =   { "Enter/Edit Word" };
 76      VAR_STATIC char READONLY new_word_str[] =      { "New Word" };
 77      VAR_STATIC char READONLY view_word_str[] =     { "View Words:" };
 78      VAR_STATIC char READONLY edit_word_str[] =     { "Ready to Edit" };
 79      VAR_STATIC char READONLY thes_str[] =          { "Correct Thes" };
 80      VAR_STATIC char READONLY working_str[] =       { "Working..." };
 81      VAR_STATIC char READONLY syn_work_str[] =      { "Syn set" };
 82      VAR_STATIC char READONLY def_work_str[] =      { "Define " };
 83      VAR_STATIC char READONLY cand_done_str[] =     { "List size" };
 84      VAR_STATIC char READONLY cand_work_str[] =     { "Making List..." };
 85      VAR_STATIC char READONLY hyph_work_str[] =     { "Hyphenation" };
 86      VAR_STATIC char READONLY no_find_str[] =       { "Sorry Can't Help" };
 87      VAR_STATIC char READONLY no_more_str[] =       { "   No More" };
 88      VAR_STATIC char READONLY ready_str[] =         { "    Ready" };
 89      VAR_STATIC char READONLY correct_str[] =       { "Correct" };
 90      VAR_STATIC char READONLY of_str[] =            { " of"};
 91
 92          /* Odds and Ends */
 93      VAR_STATIC BYTE ready_str_flag;
 94      VAR_STATIC BYTE T1avail;                /* Thes entry available ? (0 or # avail) */
 95      VAR_STATIC BYTE W1avail;                /* Original word correctly spelled by Thes or Speller */
 96      VAR_STATIC BYTE curr_syn_set;           /* Current Synonym Set */
 97      VAR_STATIC BYTE num_cands;              /* Number of Candidates */
 98      VAR_STATIC char *stringptr;      /* General purpose string ptr */
 99
100                      /* Local Macros */
101
102                      /* Local Function Protoypes */
103      void do_it_all(void);
104      char *build_msg(char *in_string, int number);
105
106                      /*  ###    Module Code   ###   */
107
108
109      /***************************************************************\
110      * build_msg - Takes a message, and a number, converts number to it's ASCII *
111      * representation, concatenates the two into a message buffer. Returns pointer*
112      * to the message buffer. Leading zeros supressed and blank filled.          *
113      * Notes: For sthi only. Number range 0..99...                               *
114      \***************************************************************/
115      FUNC_STATIC char *build_msg(in_string, number)
116      char *in_string;
117      int number;
118
119   1  {
120   1      VAR_STATIC char tmp_string[7];
121   1      VAR_STATIC char *strptr;
122   1
123   1      Fenter("build_msg");
124   1      strcpy(msg_buf, in_string);
125   1
126   1      strptr = tmp_string + 6;
127   1      *strptr-- = EOLN;
128   1
129   2      do {
130   2          *strptr-- = (number % 10) + '0';
131   2          number = number / 10;
132   1      } while (number);
133   1
134   1      *strptr = ' ';
135   1
136   1      strcat(msg_buf, strptr);
137   1      Fleave("build_msg");
138   1      return(msg_buf);
139      }
140
141
142      /***************************************************************\
143      *              Procedure to do it all (cand/def/cand def).                  *
144      \***************************************************************/
145      FUNC_STATIC void do_it_all()
146
147   1  {
148   1      /* repeat_key(RSET, SC_RT); */
149   1      StartTimer(ReminderTimer, RemindTime);
150   1      set_repeat(KeyGroup4, rt_arw_M);    /* Make sp-rt_arrow repeat */
151   1      num_cands = 0;              /* Must Initialize */
152   1      curr_syn_set = 0;           /* Must Initialize */
153   1      s1.direction = SC_TP;       /* default scrolling start up */
154   1      s1.numlines = 1;
155   1      s1.inpt_buf = word_buf;
156   1      W1avail = do_spell(word_buf);
157   1      T1avail = in_thes(word_buf);
158   1      if (T1avail) actv_message = build_msg(thes_str, T1avail);
159   2      if ( W1avail ) {
160   2          if (!T1avail) actv_message = correct_str;
161   2          ScrnState = OkSpell;
162   2      } else {
163   3          if (T1avail) {  /* Wasn't in speller but was in thes */
164   3              W1avail = 1;
165   3              ScrnState = OkSpell;
```

```
166  3            } else {                             /* Was not in speller or thes */
167  3                num_cands = do_cand(word_buf); /* ...   attempt a correction */
168  3                if (num_cands) {
169  4                    actv_message = build_msg(cand_done_str, num_cands);
170  4                    ScrnState = CandLst;
171  4                    s1.inpt_buf = cand_buf;       /* Override default */
172  4                } else {
173  4                    flash_to_dsply(no_find_str);
174  4                    return;
175  3                }
176  2            }
177  1        }
178  1
179  1        WaitTmrKbd();           /* Wait for working msg */
180  1        stick_to_dsply(actv_message);       /* Put up result msg */
181  1        if (LCD_type == _1LINE) WaitTmrKbd();   /* Wait if a 1 line dsply */
182  1        scroll1();                      /* Start (init) scrolling */
183  1        Add1Str();              /* Place word_buf in view (history) list */
184  2        do {
185  2            if (ScrnState != HuntWord) curs_ctrl(CURSOR_OFF);
186  2            inpt_var = check_key();
187  3            if (LCD_type == _1LINE) { /* Otherwise don't & avoid L0 flashing */
188  3                if (inpt_var != NO_KEY) StartTimer(ReminderTimer, RemindTime);
189  4                if (!CheckTimer(ReminderTimer)) {
190  4                    flash_to_dsply(actv_message);
191  4                    StartTimer(ReminderTimer, RemindTime);
192  3                }
193  2            }
194  2 #ifdef i80386
195  2            do_time();
196  2 #endif
197  3            switch (inpt_var) {
198  3                case SC_UP:
199  3                case SC_DN:
200  3                case SC_LT:
201  3                case SC_RT:
202  4                    if (ScrnState == HuntWord) {
203  4                        move_cursor();
204  4                    } else {
205  4                        s1.direction = inpt_var;
206  4                        scroll1();
207  3                    }
208  3                    break;
209  3                case SC_SL:
210  3                case SC_SR:
211  4                    if (ScrnState != HuntWord) {
212  4                        s1.direction = inpt_var;
213  4                        scroll1();
214  3                    }
215  3                    break;
216  3                case PG_TP:
217  3                    s1.direction = SC_TP;
218  3                    scroll1();
219  3                    break;
220  3                case PG_BM:
221  3                    s1.direction = SC_BM;
222  3                    scroll1();
223  3                    break;
224  3                case PG_UP:
225  3                case FIRST:
226  4                    switch(ScrnState) {
227  4                        case SynLst:
228  5                            if (curr_syn_set > 1) {
229  5                                if (inpt_var == FIRST) curr_syn_set = 1;
230  5                                else curr_syn_set--;
231  5                                actv_message = build_msg(syn_work_str, curr_syn_set);
232  5                                strcat(msg_buf, of_str);
233  5                                actv_message = build_msg(msg_buf, T1avail);
234  5                                stick_to_dsply(msg_buf);
235  5                                do_one_syn(curr_syn_set, sb.syn_buf);
236  5                                s1.inpt_buf = sb.syn_buf;
237  5                                s1.direction = SC_TP;
238  5                                if (LCD_type == _1LINE) WaitTmrKbd();
239  5                                scroll1();
240  4                            } else flash_to_dsply(no_more_str);
241  4                            break;
242  4                        case ThesDef:
243  5                            if (curr_syn_set > 1) {
244  5                                if (inpt_var == FIRST) curr_syn_set = 1;
245  5                                else curr_syn_set--;
246  5                                actv_message = build_msg(def_work_str, curr_syn_set);
247  5                                strcat(msg_buf, of_str);
248  5                                actv_message = build_msg(msg_buf, T1avail);
249  5                                stick_to_dsply(msg_buf);
250  5                                do_1_tdef(sb.tdef_buf, &curr_syn_set);
251  5                                s1.inpt_buf = sb.tdef_buf;
252  5                                s1.direction = SC_TP;
253  5                                if (LCD_type == _1LINE) WaitTmrKbd();
254  5                                scroll1();
255  4                            } else flash_to_dsply(no_more_str);
256  4                            break;
257  4                        default:
258  4                            break;
259  3                    }
260  3                    break;
261  3                case PG_DN:
262  3                case LAST:
263  4                    switch(ScrnState) {
264  4                        case CandLst:    /* do this if the "more" bit is set */
265  4                            if (inpt_var == LAST) break;
266  5                            if (MoreList) {
267  5                                stick_to_dsply(cand_work_str);
268  5                                num_cands = do_morecand();
269  5                                actv_message = build_msg(cand_done_str, num_cands);
270  5                                WaitTmrKbd();
```

```
271  5                            stick_to_dsply(msg_buf);
272  5                            sl.inpt_buf = cand_buf;
273  5                            sl.direction = SC_TP;
274  5                            if (LCD_type == _1LINE) WaitTmrKbd();
275  5                            scroll1();
276  4                        } else flash_to_dsply(no_more_str);
277  4                        break;
278  4                    case SynLst:
279  5                        if (curr_syn_set < T1avail) {
280  5                            if (inpt_var == LAST) curr_syn_set = T1avail;
281  5                            else curr_syn_set++;
282  5                            actv_message = build_msg(syn_work_str, curr_syn_set);
283  5                            strcat(msg_buf, of_str);
284  5                            actv_message = build_msg(msg_buf, T1avail);
285  5                            stick_to_dsply(msg_buf);
286  5                            do_one_syn(curr_syn_set, sb.syn_buf);
287  5                            sl.inpt_buf = sb.syn_buf;
288  5                            sl.direction = SC_TP;
289  5                            if (LCD_type == _1LINE) WaitTmrKbd();
290  5                            scroll1();
291  4                        } else flash_to_dsply(no_more_str);
292  4                        break;
293  4                    case ThesDef:
294  5                        if (curr_syn_set < T1avail) {
295  5                            if (inpt_var == LAST) curr_syn_set = T1avail;
296  5                            else curr_syn_set++;
297  5                            actv_message = build_msg(def_work_str, curr_syn_set);
298  5                            strcat(msg_buf, of_str);
299  5                            actv_message = build_msg(msg_buf, T1avail);
300  5                            stick_to_dsply(msg_buf);
301  5                            do_1_tdef(sb.tdef_buf, &curr_syn_set);
302  5                            sl.inpt_buf = sb.tdef_buf;
303  5                            sl.direction = SC_TP;
304  5                            if (LCD_type == _1LINE) WaitTmrKbd();
305  5                            scroll1();
306  4                        } else flash_to_dsply(no_more_str);
307  4                        break;
308  4                    case OkSpell:
309  4                        if ( (T1avail) && (inpt_var == PG_DN) ) put_key(SynMode);
310  4                        break;
311  4                    default:
312  4                        break;
313  3                    }
314  3                    break;
315  3                case ENTER:
316  3                case EditMode:
317  4                    switch (ScrnState) {
318  4                        case HuntWord:    /* try and take the word */
319  4                            stringptr = find_str();
320  5                            if (stringptr != NULL) {
321  5                                get_word(stringptr);
322  5                                strupr(word_buf);
323  5                                curs_ctrl(CURSOR_OFF);
324  5                                if (inpt_var == ENTER) put_key(ENTER); /* Don't move this before the wait -- a key aborts th
                                        wait */
325  5                                else  stick_to_dsply(edit_word_str);
326  5                                if (LCD_type == _1LINE) WaitTmrKbd();
327  5                                build_word(word_buf, NO_KEY, &word_size);
328  5                                return;
329  4                            }
330  4                            break;
331  4                        case HyphWrd:    /* here (just take currword in wordbuf?) */
332  4                            break;
333  4                        default:
334  5                            if (inpt_var == ENTER) { /* Just take whats on left side of scroll window */
335  5                                actv_message = new_word_str;
336  5                                stick_to_dsply(actv_message);
337  5                                get_whole_word(sl.scrllptr);
338  5                                strupr(word_buf);
339  5                                build_word(word_buf, NO_KEY, &word_size);
340  5                                WaitTmrKbd();
341  5                                put_key(ENTER); /* Don't move this before the wait -- a key aborts the wait */
342  5                                return;
343  5                            } else { /* inpt_var was EditMode */
344  5                                actv_message = enter_edit_word_str;
345  5                                if (LCD_type == _1LINE) flash_to_dsply(actv_message);
346  5                                else stick_to_dsply(actv_message);
347  5                                ScrnState = HuntWord;
348  5                                stat_buf[0] = NO_SYM;
349  5                                stat_to_dsply();
350  5                                home_cursor();
351  5                                curs_ctrl(CURSOR_ON);
352  4                            }
353  4                            break;
354  3                    }
355  3                    break;
356  3                case NO_KEY:
357  3                    break;
358  3                case CLEAR:
359  4                    if (word_size == 0) {
360  4 #ifdef ASIC
361  5                        if (straps & (POCKET+D203030)) {
362  5                            sys_clear = TRUE;
363  4                        } else
364  4                            shut_off();
365  4 #else
366  4                        sys_clear = TRUE;
367  4 #endif
368  4                    } else {
369  4                        Fdebug("Clearing System 2\n", NoParam, NoParam, NoParam);
370  4                        sys_clear = TRUE;
371  3                    }
372  3                    break;
373  3                case HYPHEN:
```

```
374   3                    case QUEST:
375   3                        stick_to_dsply(cand_work_str);
376   3                        if (inpt_var == HYPHEN)  strcat(word_buf, "-");
377   3                        num_cands = do_cand(word_buf);
378   3                        if (inpt_var == HYPHEN)  word_buf[ strlen(word_buf) - 1 ] = EOLN;
379   3                        WaitTmrKbd();
380   4                        if (num_cands)  {
381   4                            actv_message = build_msg(cand_done_str, num_cands);
382   4                            stick_to_dsply(msg_buf);
383   4                            s1.inpt_buf = cand_buf;
384   4                            s1.direction = SC_TP;
385   4                            s1.numlines = 1;
386   4                            ScrnState = CandLst;
387   4                            if (LCD_type == _1LINE) WaitTmrKbd();
388   4                            scroll1();
389   3                        } else flash_to_dsply(no_find_str);
390   3                        break;
391   3                    case HyphMode:
392   3                        if (ScrnState == HuntWord) home_cursor();
393   4                        else {
394   5                            if ( (ScrnState != HyphWrd)  && (W1avail) ) { /* Go Hyph */
395   5                                stick_to_dsply(hyph_work_str);
396   5                                do_hyph(word_buf, sb.hyph_buf);
397   5                                actv_message = hyph_work_str;
398   5                                s1.inpt_buf = sb.hyph_buf;
399   5                                s1.direction = SC_TP;
400   5                                s1.numlines = 1;
401   5                                ScrnState = HyphWrd;
402   5                                if (LCD_type == _1LINE) WaitTmrKbd();
403   5                                scroll1();
404   4                            }
405   3                        }
406   3                        break;
407   3                    case SynMode:
408   4                        if ((ScrnState != SynLst) && (T1avail)) {       /* Go Syn */
409   4                            if ( (ScrnState != ThesDef) && (curr_syn_set == 0) ) curr_syn_set = 1; /* Get def for 1st Syn S
410   4                            actv_message = build_msg(syn_work_str, curr_syn_set);
411   4                            strcat(msg_buf, of_str);
412   4                            actv_message = build_msg(msg_buf, T1avail);
413   4                            stick_to_dsply(msg_buf);
414   4                            do_one_syn(curr_syn_set, sb.syn_buf);
415   4                            s1.inpt_buf = sb.syn_buf;
416   4                            s1.direction = SC_TP;
417   4                            ScrnState = SynLst;
418   5                            if (LCD_type == _1LINE) {
419   5                                s1.numlines = 1;
420   5                                WaitTmrKbd();
421   4                            } else s1.numlines = 2;
422   4                            scroll1();
423   3                        }
424   3                        break;
425   3                    case DefMode:
426   4                        if ( (ScrnState != ThesDef) && (T1avail) ) {
427   4                            if ( (ScrnState != SynLst) && (curr_syn_set == 0) ) curr_syn_set = 1; /* Get def for 1st Syn Se
428   4                            actv_message = build_msg(def_work_str, curr_syn_set);
429   4                            strcat(msg_buf, of_str);
430   4                            actv_message = build_msg(msg_buf, T1avail);
431   4                            stick_to_dsply(msg_buf);
432   4                            do_1_tdef(sb.tdef_buf, &curr_syn_set);
433   4                            s1.inpt_buf = sb.tdef_buf;
434   4                            s1.direction = SC_TP;
435   4                            ScrnState = ThesDef;
436   5                            if (LCD_type == _1LINE) {
437   5                                s1.numlines = 1;
438   5                                WaitTmrKbd();
439   4                            } else s1.numlines = 2;
440   4                            scroll1();
441   3                        }
442   3                        break;
443   3                    case CurrMode:    /* Show current string */
444   4                        if (ScrnState != CurrWord) {
445   4                            stick_to_dsply(curr_word_str);
446   4                            actv_message = curr_word_str;
447   4                            s1.inpt_buf = word_buf;
448   4                            s1.direction = SC_TP;
449   4                            s1.numlines = 1;
450   4                            ScrnState = CurrWord;
451   4                            if (LCD_type == _1LINE) WaitTmrKbd();
452   4                            scroll1();
453   3                        }
454   3                        break;
455   3                    case OrigMode:   /* View list from top (oldest first) */
456   3                    case ViewMode:   /* View list from bottom (newest first) */
457   4                        if (inpt_var == OrigMode) {
458   4                            actv_message = query_word_str;
459   4                            s1.direction = SC_TP;
460   4                        } else {
461   4                            actv_message = build_msg(view_word_str, Num_Saved);
462   4                            s1.direction = SC_BM;
463   3                        }
464   3                        stick_to_dsply(actv_message);
465   3                        actv_message = build_msg(view_word_str, Num_Saved);
466   3                        s1.inpt_buf = StrSav_buf;
467   3                        s1.numlines = 1;
468   3                        ScrnState = ViewWords;
469   3                        if (LCD_type == _1LINE) WaitTmrKbd();
470   3                        scroll1();
471   3                        break;
472   3                    case WhereMode:
473   3                        flash_to_dsply(actv_message);
474   3                        break;
475   3                    case QuickMode:
476   3                        word_buf[0] = EOLN;
```

```
477  3                          word_buf[1] = EOLN;
478  3                          word_size = 0;
479  3                          build_word(word_buf, NO_KEY, &word_size);
480  3                          put_key(ENTER); /* Don't move this before the wait -- a key aborts the wait */
481  3                          return;
482  3                      default:
483  3                          break; /* Default Case */
484  2              } /* end of switch */
485  1          } while (!sys_clear);
486  } /* end of do_it_all() */
487
488
489
490    void PtHimain()
491
492  1  {
493  1
494  2      if (LCD_type == _1LINE) {
495  2          L0_length = 16;
496  2          si.firstline = L0;
497  2          si.numcols = 15;
498  2          stat_fld_pos = 15;              /* In LCD coordinates */
499  2      } else {
500  2          L0_length = 20;
501  2          si.firstline = L1;
502  2          si.numcols = 30;
503  2          stat_fld_pos = 19;              /* In LCD coordinates */
504  1      }
505  1      thesinit();
506  1      InitConsole();                      /* Set up console (keyboard & display) */
507  1
508  2      while (1) {                         /* Return system to its initial state */
509  2          sys_clear = FALSE;
510  2          clear_lcd();
511  2          word_size = 0;
512  2          Tlavail = 0;                    /* No Thes entries available */
513  2          ScrnState = NoSpell;            /* Initial Screen State */
514  2  #ifdef i80386
515  2          InitSpellIfc();                 /* Init speller interface */
516  2          InitSahIfc();                   /* Init hyphenation interface */
517  2  #endif
518  2          InitStrSav();
519  2          StartTimer(ReminderTimer, RemindTime);
520  2          ready_str_flag = FALSE;
521  2
522  3          do {
523  3              if (word_size != 0) ready_str_flag = FALSE;
524  4              if ((word_size == 0) && (!ready_str_flag)) {
525  4                  stick_to_dsply(ready_str);
526  4                  stat_buf[0] = NO_SYM;
527  4                  stat_to_dsply();
528  4                  ready_str_flag = TRUE;
529  3              }
530  4              switch ( (inpt_var = check_key()) ) {
531  4                  case BS:
532  4                      if (word_size > 0) unbuild_word(word_buf, &word_size); /* back space */
533  4                      break;
534  4                  case ENTER:
535  5                      if (word_buf[0] == '-') {
536  6                          switch (word_buf[1]) {
537  6                              case 'G':
538  6                                  glass_test();
539  6                                  break;
540  6                              case 'K':
541  6                                  key_test();
542  6                                  break;
543  6                              case 'C':
544  6                                  word_capture();
545  6                                  break;
546  6                              case 'R':
547  6                                  stick_to_dsply(working_str);
548  7                                  if (word_buf[2] == 'O') {
549  7                                      rom_test();
550  7                                  } else {
551  7                                      ram_test();
552  6                                  }
553  6                                  break;
554  6                              case 'M':
555  7                                  if ((word_buf[2] == 'L') && (word_buf[3] == 'C')) {
556  7                                      stick_to_dsply("Abe Jules Pete");
557  7                                      WaitTmrKbd();
558  7                                      stick_to_dsply("Bernie Bob Dave");
559  7                                      WaitTmrKbd();
560  7                                      stick_to_dsply("and many others");
561  7                                      WaitTmrKbd();
562  6                                  }
563  6                                  break;
564  6                              default:
565  6                                  do_games(word_buf);
566  6                                  break;
567  5                          }
568  5                          sys_clear = TRUE;
569  5                      } else {
570  6                          if (word_size > 0)  {
571  6                              delline(L0);
572  6                              disp_line(L0, working_str);
573  6                              StartTimer(CountDownTimer,QuarterSec);
574  6                              do_it_all();
575  6                              curs_ctrl(CURSOR_OFF);
576  6                              if (LCD_type != _1LINE) delline(L2);
577  6                              ScrnState = NoSpell;
578  6                              clear_repeat(KeyGroup4, rt_arw_M);      /* Kill key repeat on Rt Scroll/Space */
579  5                          }
```

```
580  4                              }
581  4                              break; /* end of case "enter" */
582  4                         case SC_UP:
583  4                         case SC_DN:
584  4                              alt_contrast();
585  4                              break;
586  4                         case NO_KEY:
587  4                              break;
588  4                         case CLEAR:
589  5                              if (word_size == 0) {
590  5                                  /* Shut off the system */
591  5  #ifdef ASIC
592  6                                  if (straps & (POCKET+D203030)) {
593  6                                      sys_clear = TRUE;
594  5                                  } else
595  5                                      shut_off();
596  5  #else
597  5                                  sys_clear = TRUE;
598  5  #endif
599  5                              } else {
600  5                                  Fdebug("Clearing 1\n", NoParam, NoParam, NoParam);
601  5                                  sys_clear = TRUE;
602  4                              }
603  4                              break;
604  4                         case SPCBAR:
605  4                         case HYPHEN:
606  4                         case QUEST:
607  4                         default:
608  4                              if ( (inpt_var == SPCBAR) && (word_size == 0) ) break;
609  4                              Fdebug("default case.. word_size: %d\n", word_size, NoParam, NoParam);
610  4                              if (word_size )= MAX_WORD) flash_to_dsply(no_more_str); /* word is too large */
611  4                              else build_word(word_buf, inpt_var, &word_size);
612  4                              break;
613  3                     } /* end of switch */
614  2                } while (!sys_clear);  /* end of first level input loop */
615  1           } /* end of do forever loop */
616     } /* end of himain module */

Thes.H                               1      1
Thes.H         THESPROD              2    107
Thes.H         WORDPROD              2    108
Thes.H         isunf                 3    135
Thes.H                               3    143

1    /*********************************************************************\
 2
 3        Product Number: SC-50-5.7
 4
 5        Version: rev5.7
 6
 7        Product Name: Spelling Components - Thesaurus
 8
 9        Filename: thes.h
10
11
12        This document contains private and confidential information and
13        its disclosure does not constitute publication.  Some of the
14        information herein also may appear in United States and or
15        Foreign Patents Pending.  All rights are reserved by Proximity
16        Technology Inc., except those specifically granted by license.
17
18    \*********************************************************************/
19
20    #ifndef SC_THES
21    #define SC_THES
22
23    /* part of speech numbers */
24
25    #define ADJ          0
26    #define ADJSP        1
27    #define ADV          2
28    #define CONJ         3
29    #define INTERJ       4
30    #define NOUN         5
31    #define PLNOUN       6
32    #define SPNOUN       7
33    #define PREP         8
34    #define PRON         9
35    #define VERB         10
36    #define VERBSP       11
37    #define VERBAUX      12
38    #define NPOS         13
39
40    /* indices corresponding to various entry types */
41
42    #define TH_SYN   0
43    #define TH_CMP   1
44    #define TH_REL   2
45    #define TH_CON   3
46    #define TH_ANT   4
47
48    /* part of speech bit positions, used in control */
49
50    #define TH_ADJ        0x0001L
51    #define TH_ADJSP      0x0002L
52    #define TH_ADV        0x0004L
53    #define TH_CONJ       0x0008L
54    #define TH_INTERJ     0x0010L
55    #define TH_NOUN       0x0020L
```

```
56      #define TH_PLNOUN       0x0040L
57      #define TH_SPNOUN       0x0080L
58      #define TH_PREP         0x0100L
59      #define TH_PRON         0x0200L
60      #define TH_VERB         0x0400L
61      #define TH_VERBSP       0x0800L
62      #define TH_VERBAUX      0x1000L
63
64      /* list retrieval controls */
65
66      #define TH_RETSYN       0x2000L
67      #define TH_RETCMP       0x4000L
68      #define TH_RETREL       0x8000L
69      #define TH_RETCON       0x10000L
70      #define TH_RETANT       0x20000L
71
72      /* inflection usage control bit */
73
74      #define TH_INFPOS       0x40000L
75      #define TH_INFALL       0x80000L
76      #define TH_INFSYN       0x100000L
77      #define TH_UNFDEF       0x200000L
78
79      /* thesaurus control for retrieving complete information */
80
81      #define TH_ALLPOS       0x1FFFL         /* get all part of speeches */
82      #define TH_ALLLIST      0x3E000L        /* get all the five lists */
83      #define TH_ALLMEAN      0x7F            /* get all meanings for word */
84      #define TH_ALLENTRY     0x7F            /* get all entries in a list */
85
86      /* states that a thesaurus can be */
87
88      #define TH_INIT         0x1
89      #define TH_DONE         0x2
90      #define TH_MORE         0x4
91      #define TH_UNFL         0x7
92      #define TH_STBITS       0x7
93      #define TH_CRITICAL     0x8
94
95      #define MAXMEAN         40      /* max no. of meanings */
96      #define MAXLISTS        5       /* syn,cmp,rel,con and ant */
97      #define MAXDEF          150     /* length of longest definition string */
98      #define MAXEXP          180     /* length of longest expanded def. string */
99      #define MAXHASH         40
100     #define MAXBITS         32      /* max no. of levels in huff. tree */
101     #define MAXUNF 4
102
103     /* thesaurus structure information */
104
105     #define THESLEX 0x40
106     #define THESHEAD 15                     /* number of shorts in thes header */
107     #define THESPROD (1 << 9 | 0)           /* major rev 2.0 */
108     #define WORDPROD (1 << 9 | 0)           /* word list revision 2.0 */
```

```
826 3          do {
827 3              listcnt = thesbit(fptr, LISTFLD);
828 3              Thes.tm_count[listno] += listcnt;
829 3              skipcount += listcnt;
830 2          } while (listcnt == LISTMAX);
831 1      } while ((listno = nextlist(listno, listnib)) < MAXLISTS);
832 1
833 1      skipcount += Thes.th_dirfld;
834 1
835 1  #ifdef DEBUG
836 2      if (debug) {
837 2          for (listno = 0; listno < MAXLISTS; listno++)
838 2              if (Thes.tm_count[listno] != 0)
839 2                  fprintf(stderr,"tm_count[%d]=%d\n",listno,Thes.tm_count[listno]);
840 1      }
841 1  #endif
842 1      huffskip = (int) thesbit(fptr, 8);
843 1
844 1      /* Decompress the meaning definition into the string section */
845 2      if (skip != INIT) {
846 2          Thes.tm_strend = defstr;
847 2          *Thes.tm_strend++ = Thes.tm_pos + 1;
848 3          if (unfmean) {
849 3              *Thes.tm_strend++ = Thes.tq_stage[ind]->en_rel;
850 3              Thes.tm_strend =
851 3                  strecpy(Thes.tm_strend, Thes.tq_multunf[ind]) + 1;
852 3          } else {
853 3              *Thes.tm_strend++ = FALSE;
854 2          }
855 2
856 2          theshuff(fptr, (char *)Thes.tm_strend, huffskip);
857 2
858 3          if (Thes.tq_control & TH_UNFDEF) {
859 3              Thes.tm_strend = strend(Thes.tm_strend) + 1;
860 3          } else {
861 3              dispunf(Thes.tq_query, unfstr, meanno + 1, defstr);
862 3              Thes.tm_strend = strecpy(defstr, unfstr) + 1;
863 2          }
864 1      }
865 1
866 1      /* If skip is TRUE, seek to the end of the record */
867 1
868 2      if (skip) {
869 2          return(0);
870 1      }
871 1
872 1      /* For each list that is present, save the hash values.
873 1         Mark the indices of both the tm_strarr and tm_hashes
```

```
874   1         arrays in positions where they belong. */
875   1
876   2         for (listno = 0; listno < MAXLISTS; listno++) {
877   2
878   2             /* The current hash count is saved to indicate
879   2                where the values for the current list start. */
880   2
881   2             Thes.tm_hstart[listno] = hashcnt;
882   2             totcount = Thes.tm_count[listno];
883   2
884   2             /* The hashes themselves are now saved in the
885   2                Hashes array, except when the hash matches the
886   2                current query's hash. */
887   2
888   3             for (listcnt = 0; listcnt < totcount; listcnt++) {
889   3                 hash = thesbit(fptr, Thes.th_dirfld);
890   4                 if (hashcnt < MAXHASH && hash != worddesc) {
891   4                     Thes.tm_hashes[hashcnt++] = hash;
892   4                 } else {
893   4                     --Thes.tm_count[listno];
894   3                 }
895   2             }
896   2
897   2             /* The Thes area is updated to indicate where exactly
898   2                in the string pointer array the strings for the
899   2                current list begin. */
900   2
901   2             Thes.tm_list[listno] = Thes.tm_strarr + strcnt;
902   2             strcnt += Thes.tm_count[listno];
903   2             Thes.tm_strarr[strcnt++] = NULL;
904   1         }
905   1
906   1         return (0);
907         }
908         /* Convert a portion of hash values into strings; this will enable
909            parallel display/fetch implementation for space/time critical output.
910            The function will return a pointer to the definition string if the
911            meaning (whose number is meanno) is found, or NULL in case of a failure. */
912
913         char    *
914         thesinfo(meanno, lists, defonly)
915         int     meanno;
916         char    ***lists;
917         int     defonly;
918
919   1   {
920   1       END     *getstage();
921   1
922   1       register int    j;
923   1       register int    k;
924   1       int     thp;
925   1       int     qflag;          /* flags for the query */
926   1       int     flag;           /* flags for words in the lists */
927   1       int     posflag;        /* part of speech of the meaning */
928   1       int     listreq;
929   1       int     doinf;
930   1       UCHAR   *tmpptr;        /* Added by P.S. out of desperation */
931   1
932   1       int     listcnt;
933   1       UCHAR   **listptr;
934   1       UCHAR   phword[LONGWORD];    /* phonetically encoded low word */
              UCHAR   ...........
936   1       UCHAR   wordbuf[LONGWORD];   /* buffer */
937   1
938   2       if (--meanno >= Thes.tq_count) {
939   2           return(NULL);
940   1       }
941   1       /* Use the state bits of thesquery */
942   1
943   2       switch (Thes.tq_state) {
944   2
945   2           case TH_DONE:
946   2           case TH_UNFL:
947   2           case TH_MORE:
948   3               if (meanno >= Thes.tq_count || meanno < 0) {
949   3                   Thes.tq_state = TH_DONE;
950   3                   return (NULL);
951   2               }
952   2               /* PS getmean(Theslex->lx_file, meanno, Thes.tm_strings, MEAN); */
953   3               if (defonly) {   /* Don't want synonyms */
954   3                   getmean(Theslex->lx_file, meanno, Thes.tm_strings, DEFS);
955   3                   return(Thes.tm_strings);
956   3               } else {         /* Do want synonyms */
957   3                   getmean(Theslex->lx_file, meanno, Thes.tm_strings, MEAN);
958   2               }
959   2               listreq = (Thes.tq_control & TH_ALLLIST) >> NPOS;
960   2
961   2               doinf = thinftst(meanno, Thes.tq_unfindex[0]);
962   3               if (Thes.tm_pos == NOUN || Thes.tm_pos == SPNOUN) {
963   3                   posflag = NOUN;
964   3               } else if (Thes.tm_pos == VERB || Thes.tm_pos == VERBSP) {
965   3                   posflag = VERB;
966   3               } else {
967   3                   posflag = NPOS;
968   2               }
969   2               break;
970   2
971   2           default:
972   2               Scerror = ERR_THES | ERR_STATE;
973   2               return (NULL);
974   1       }
975   1
976   1       qflag = Qflag & (IW_COMMON | IW_PROPER | IW_ENDDOT);
```

```
977   1       /* Find the unflection stage, if any. */
978   1
979   1       Stageptr = getstage(meanno, (int)Thes.tm_pos, Thes.tq_unfindex,
980   1           Thes.tq_stage);
981   1
982   1       /* Convert all the hashes that we collected into strings.
983   1          The string pointers get saved as we go along in places where
984   1          Also, all hashes that were looked up are marked with HS_SEEN bit.
985   1       */
986   1
987   1
988   2       for (j = 0; j < MAXLISTS; j++) {
989   2
990   .           .. ...  .   .. ..
991   3               *Thes.tm_list[j] = NULL;
992   3               continue;
993   2           }
994   2
995   2       /* If TH_INFALL is not set, inflect only the synonyms */
996   2
997   3           if (doinf) {
998   4               if (j > 0 && !(Thes.tq_control & TH_INFALL)) {
999   4                   doinf = FALSE;
1000  3               }
1001  2           }
1002  2           *lists++ = (char **)Thes.tm_list[j];
1003  2           listptr = Thes.tm_list[j];
1004  2           thp = Thes.tm_hstart[j];
1005  2           listcnt = Thes.tm_count[j];
1006  3           for (k = 0; k < listcnt; k++) {
1007  3               Thes.tm_hashes[thp] |= HS_SEEN;
1008  3
1009  3           /* if hash decoding error, just ignore the hash */
1010  3
1011  3               if (theshash(Thes.tm_hashes[thp++] & DIRBITS,
1012  4                   phword, Theslex) == ERROR) {
1013  4                   continue;
1014  3               }
1015  3
1016  3               flag = ctoi(Scfdecomp[0]);
1017  3               lextoasc(phword, wordbuf, flag);
1018  3
1019  4.              if (doinf) {
1020  5                   if (flag == IW_PROPER) {
1021  5                       if (doflags(wordbuf, infword,
1022  6                           MAXWORD) == ERROR) {
1023  6                           Thes.tm_count[j]--;
1024  6                           continue;
1025  5                       }
1026  5                       strcpy(wordbuf, infword);
1027  4                   }
1028  4                   if (inflect(wordbuf, infword, posflag,
1029  5                       Stageptr)) {
1030  5                       if ((flag == IW_PROPER)
1031  5                           && Stageptr->en_rel != RE_CM
1032  6                           && Stageptr->en_rel != RE_SU) {
1033  6                           undoflags(infword, flag,
1034  6                               wordbuf);
1035  6                       } else {
1036  6                           strcpy(wordbuf, infword);
1037  5                       }
1038  5                   } else {
1039  5                       Thes.tm_count[j]--;
1040  5                       continue;
1041  4                   }
1042  3               }
1043  3
1044  3           /* copy the word in wordbuf (transformed, if
1045  3              necessary, to the format of the query) to
1046  3              Thes.tm_strend.
1047  3           */
1048  3
1049  3               setqflags(wordbuf, qflag, flag, doinf);
1050  3
1051  3               *listptr++ = Thes.tm_strend;
1052  3               Thes.tm_strend = strend(Thes.tm_strend) + 1;
1053  3
1054  3           /* If string space is exhausted, return graciously */
1055  3
1056  4               if (Thes.tm_strend >= Thes.tm_sentinel) {
1057  4                   Scerror = ERR_THES | ERR_STR;
1058  4                   return (NULL);
1059  3               }
1060  2           }
1061  2           *listptr = NULL;
1062  1       }
1063  1
1064  1       tmpptr = Thes.tm_strend;
1065  1       *tmpptr++ = '\0';
1066  1       *tmpptr++ = '\0';
1067  1       *tmpptr = '\0';
1068  1
1069  1       return ((char *)Thes.tm_strings);
1070      }
1071
1072
1073      setqflags(inword, qflag, flag, inf)
1074      UCHAR   *inword;
1075      int     qflag;
1076      int     flag;
1077      int     inf;
1078  1   {
1079  1       register UCHAR *ep;
```

```
1080  1          register UCHAR *ss;
1081  1          register UCHAR *op;
1082  1          int     savech;
1083  1          int     setnew;
1084  1
1085  1          /* check if the flags corresponding to the query have to be
1086  1             transferred to inword. */
1087  1
1088  1          if (setnew = (qflag & IW_DOTS) ) (flag & IW_DOTS)
1089  2          || (qflag & IW_CASE) ) (flag & IW_CASE)) {
1090  2              flag = qflag & ~(flag & IW_ENDDOT);
1091  2          }
1092  2          if (!inf) {
1093  3              if (setnew) {
1094  3                  undoflags(inword, flag, Thes.tm_strend);
1095  3              } else {
1096  3                  strcpy(Thes.tm_strend, inword);
1097  2              }
1098  2              return;
1099  1          }
1100  1
1101  1          ss = ep = inword;
1102  1          op = Thes.tm_strend;
1103  2          while (TRUE) {
1104  2              /* If inword is a multiple word (e.g. broke/broken,
1105  2                 leveled or levelled) apply the new flag to each word.
1106  2              */
1107  2
1108  3              if (!*ep || *ep == UNFSEP || *ep == INFSEP) {
1109  3                  savech = *ep;
1110  3                  *ep++ = 0;
1111  4                  if (setnew) {
1112  4                      undoflags(ss, flag, op);
1113  4                      op = strend(op);
1114  4                  } else {
1115  4                      op = strcpy(op, ss);
1116  3                  }
1117  4                  if (!savech) {
1118  4                      return;
1119  4                  } else if (savech == UNFSEP) {
1120  4                      *op++ = UNFSEP;
1121  4                  } else {
1122  4                      op = strcpy(op, (UCHAR *)INFALT);
1123  3                  }
1124  3                  ss = ep;
1125  3                  continue;
1126  2              }
1127  2              ++ep;
1128  1          }
1129           }
1130
1131          /* Get the next list's number from the list nibble section */
1132
1133
1134          nextlist(listno, pos)
1135          int     listno;
1136          int     pos;
1137  1      {
1138  2          while (listno < MAXLISTS && !(pos & HAS_CMP << listno)) {
1139  2              listno++;
1140  1          }
1141  1          return (listno + 1);
1142        }
1143
1144          /* Determine the unflection stage for a meaning */
1145
1146          END    *
1147          getstage(meanno, pos, unfindex, stage)
1148          int     meanno;
1149          int     pos;
1150          short   *unfindex;
1151-         END    **stage;
1152  1      {
1153  1
1154  1          END     *unfstage();
1155  1
1156  1          register int    ind;
1157  1          register END    *stgptr;
1158  1
1159  1          ind = 0;
1160  1          stgptr = NULL;
1161  2          if (meanno < unfindex[ind++]) {
1162  2              return (stgptr);
1163  1          }
1164  2          while (ind < MAXUNF) {
1165  3              if (meanno < unfindex[ind++]) {
1166  3                  break;
1167  2              }
1168  1          }
1169  1          ind -= 2;
1170  2          if (ind != MAXUNF) {
1171  2              stgptr = stage[ind];
1172  3              if (pos == VERBSP && stgptr->en_rel == PR_PX) {
1173  3                  stgptr = unfstage(SV_PX + 1);
1174  3              } else if (pos == SPNOUN && stgptr->en_rel == SI_PL) {
1175  3                  stgptr = unfstage(SP_PL + 1);
1176  2              }
1177  1          }
1178  1          return (stgptr);
1179        }
1180
1181          /* Check an unflection stage entry against the controls used
1182             to retrieve information. This function is invoked only if
1183             TH_ALLPOS is not set, signifying that only certain parts
1184             of speech are desired. */
```

```
1185
1186
1187      badunf(ind, allpos)
1188      int ind;
1189      int allpos;
1190 1    {
1191 1        register END     *stage;
1192 1        register char    unfpos;
1193 1        int      noun;
1194 1        int      verb;
1195 1
1196 2        if (Thes.tq_unfindex[0] > 0) {
1197 3            if ((stage = Thes.tq_stage[ind]) == NULL) {
1198 3                return (TRUE);
1199 2            }
1200 3            switch (stage->en_rel) {
1201 3                case PR_PS :
1202 3                case PR_PP :
1203 3                case PR_PX :
1204 3                case PR_PC :
1205 3                case SV_PX :
1206 3                case SI_PL :
1207 3                case SP_PL :
1208 3                case TP_SI :
1209 3                case RE_CM :
1210 3                case RE_SU :
1211 3                case TP_SP :
1212 3                case TP_FP :
1213 3                    break;
1214 3                default:
1215 3                    return (TRUE);
1216 2            }
1217 1        }
1218 1
1219 1        noun = Thes.tq_control & (TH_NOUN | TH_SPNOUN);
1220 1        verb = Thes.tq_control & (TH_VERB | TH_VERBSP);
1221 1
1222 1        if (ind > 0
1223 1            && Thes.tq_count != Thes.tq_unfindex[0]
1224 1            && Thes.tq_stage[ind] == Thes.tq_stage[ind - 1]
1225 2            && (stage->en_rel == PR_PC || stage->en_rel == PR_PX)) {
1226 2            return (TRUE);
1227 1        }
1228 1        /* If all parts of speech are desired, preserve the unflection */
1229 1
1230 2        if (allpos) {
1231 2            return (FALSE);
1232 1        }
1233 1        if ((stage->en_pos & TH_NOUN)
1234 1            && (stage->en_pos & (TH_VERB | TH_VERBSP))
1235 2            && !(noun && verb)) {
1236 3            if (noun) {
1237 3                Thes.tq_stage[ind]++;
1238 3            } else {
1239 3                Thes.tq_stage[ind] += 3;
1240 2            }
1241 2            Thes.tq_unfpos[ind] = Thes.tq_stage[ind]->en_pos;
1242 1        }
1243 2        if (Thes.tq_control & Thes.tq_stage[ind]->en_pos) {
1244 2            return (FALSE);
1245 1        }
1246 1
1247 1        /* Make allowance for those unflections which involve a change
1248 1           in the part of speech, e.g. adjective -> noun */
1249 1
1250 2        switch (Thes.tq_stage[ind]->en_rel) {
1251 2
1252 2            case AJ_NN:
1253 2                unfpos = TH_NOUN | TH_SPNOUN;
1254 2                break;
1255 2            case AJ_AV:
1256 2                unfpos = TH_ADV;
1257 2                break;
1258 2            case VB_AJ:
1259 2                unfpos = TH_ADJ;
1260 2                break;
1261 2            case VB_NN:
1262 2                unfpos = TH_NOUN | TH_SPNOUN;
1263 2                break;
1264 2            default:
1265 2                return (TRUE);
1266 1        }
1267 2        if (Thes.tq_control & unfpos) {
1268 2            return (FALSE);
1269 1        }
1270 1        return (TRUE);
1271      }
1272
1273      /* Determine if a particular part of speech is acceptable even
1274         if Thes.tq_control indicates that it is not. This check is
1275         relevant only for those meanings that result from an unflection
1276         of the query.
1277      */
1278
1279
1280      goodpos(pos)
1281      int      pos;
1282 1    {
1283 1        END      *unfstage();
1284 1
1285 1        UCHAR    infword[MAXWORD];
1286 1
1287 2        if (Thes.tq_state != TH_UNFL) {
```

```
1288  2            return (FALSE);
1289  1        }
1290  2        switch (pos) {
1291  2        case VERBSP:
1292  2            if (!((Thes.tq_control & TH_VERB)
1293  3                && Stageptr->en_rel == PR_PX)) {
1294  3                return (FALSE);
1295  2            }
1296  2            Stageptr = unfstage(SV_PX + 1);
1297  2            break;
1298  2
1299  2        case SPNOUN:
1300  2            if (!((Thes.tq_control & TH_NOUN)
1301  3                && Stageptr->en_rel == SI_PL)) {
1302  3                return (FALSE);
1303  2            }
1304  2            Stageptr = unfstage(SP_PL + 1);
1305  2            break;
1306  2        default:
1307  2            return (FALSE);
1308  1        }
1309  2        if (unfexc(Unfquery, infword, Stageptr->en_rel) > 0) {
1310  2            return (isinf(Thes.tq_query, infword));
1311  1        }
1312  1        return (TRUE);
1313     }
1314
1315     /* Inflect can produce multiple inflections separated by UNFSEP.
1316        Check if "word" matches any of the inflections in "infword".
1317        */
1318
1319
1320     isinf(word, infword)
1321     UCHAR   *word;
1322     UCHAR   *infword;
1323  1  {
1324  1
1325  1      register UCHAR *wrdptr;
1326  1
1327  1      wrdptr = infword;
1328  2      while (*wrdptr != '\0') {
1329  3          if (*wrdptr++ == UNFSEP) {
1330  3              *(wrdptr - 1) = '\0';
1331  4              if (strucmp(word, infword) == 0) {
1332  4                  return (TRUE);
1333  3              }
1334  3              word = wrdptr;
1335  2          }
1336  1      }
1337  1      return (strucmp(word, infword) == 0);
1338     }
1339
1340     /* This function is invoked by the user to set the controls
1341        that determines the behaviour of the thesaurus.
1342        */
1343
1344     thescntrl(control)
1345     long    control;
1346  1  {
1347  1
1348  2      if (!(control & TH_ALLPOS)) {
1349  2          control |= TH_ALLPOS;
1350  1      }
1351  2      if (!(control & TH_ALLLIST)) {
1352  2          control |= TH_ALLLIST;
1353  1      }
1354  2      if (control & TH_INFALL) {
1355  2          control |= TH_INFSYN;
1356  1      }
1357  1      Control = control;
1358  1      Thes.tq_state = TH_INIT;
1359     }
1360
1361     /* Remove all values relating to a particular unflection.
1362        The returned value is the number of meanings that will
1363        be lost as a result of discarding the unflection.
1364        */
1365
1366
1367     delunf(ind)
1368     register int   ind;
1369  1  {
1370  2      while (ind < MAXUNF && Thes.tq_multunf[ind] != NULL) {
1371  2          Thes.tq_multunf[ind]  = Thes.tq_multunf[ind + 1];
1372  2          Thes.tq_stage[ind]    = Thes.tq_stage[ind + 1];
1373  2          Thes.tq_unfpos[ind]   = Thes.tq_unfpos[ind + 1];
1374  2          Thes.tq_worddesc[ind] = Thes.tq_worddesc[ind + 1];
1376  3          if (ind < MAXUNF - 1) {
1377  3              Thes.tq_numdesc[ind] = Thes.tq_numdesc[ind + 1];
1378  2          }
1379  1      }
1380     }
```

| ThesEnv.C |            | 1 | 1   |
|-----------|------------|---|-----|
| ThesEnv.C | pathadd    | 2 | 61  |
| ThesEnv.C | pathdel    | 2 | 105 |
| ThesEnv.C | lexopen    | 3 | 127 |
| ThesEnv.C | lexclose   | 3 | 146 |
| ThesEnv.C | setenglish | 3 | 153 |
|           |            | 3 | 159 |

```
/**************************************************************\

Product Number: SC-50-5.7

Version: rev5.7

Product Name: Spelling Components - Thesaurus

Filename: thesenv.c

This document contains private and confidential information and
    its disclosure does not constitute publication.  Some of the
    information herein also may appear in United States and or
    Foreign Patents Pending.  All rights are reserved by Proximity.
    Technology Inc., except those specifically granted by license.

\**************************************************************/ include <language.h>
include "lex.h"
#include "spath.h"
#include "environ.h"

extern PHON Engphon;
extern int retfalse();

/* Thesaurus language environment table */

STATIC ENVIRON Engenv = {
    ENGLISH,                /* unique integral code */
    NULL,                   /* flag combination acceptance table */
    &Engphon,               /* phonetics tables */
    retfalse,               /* function to do the query phcmp() */
    retfalse,               /* function to test if bin scan required */
    NULL,                   /* function to check words with hyphens */
    retfalse,               /* function to do compounding */
    retfalse,               /* function to do compound correction */
    retfalse,               /* function to do correct initialization */
    retfalse,               /* function for special ranking */
    retfalse,               /* function for special lexicon correction */
    NULL,                   /* prefix table */
    retfalse,               /* function to check contractions */
};

/* These routines are used to manipulate the Searchpath. */

SPENTRY *Srchend = Srchpath;     /* end of the SP array */
SPENTRY Srchpath[SRCHMAXSIZE];   /* The wordlists to search */

/* Add a new entry to the Searchpath.  Return TRUE if added.

The order in which routines like clamopen() and lexopen() are called
    forces the order in which the wordlists are searched, since pathadd()

Multiple environments are allowed in the Searchpath, but calling programs
    are restricted to one environment at a time. */

STATIC int
pathadd(flags, idcode, type, errcode)
int     flags;                  /* Searchpath control flags */
int     idcode;                 /* Searchpath entry identifier */
int     type;                   /* associated wordlist type (IW_LEX, etc.) */
int     errcode;                /* Error code for placing in Scerror. */
{
    register SPENTRY *addptr;/* pointer into the searchpath */

/* Special case: if opened with no flags then do not add the
            wordlist to the searchpath. */ if (flags == 0) {
        return (TRUE);
    }
        /* make sure there is room in the Searchpath array and that a proper
            environment has been set. */ if (Srchend == &Srchpath[SRCHMAXSIZE]) {
        Scerror = errcode | ERR_PATH;
        return (FALSE);
    }
    if (getscenv() < 1 || getscenv() > MAXLANG) {
        Scerror = errcode | ERR_ENV;
        return (FALSE);
    }
    /* put the new entry in the next available slot */ addptr = Srchend;
    addptr->sp_type = type;
    addptr->sp_flags = flags & SP_MASK;
    addptr->sp_idcode = idcode;
    addptr->sp_envcode = getscenv();

return (TRUE);
}

/* Remove the wordlist entry at 'access' from the Searchpath.  Move all the
    other entries up.

The entries in the searchpath are located by using their 'sp_access'
    fields.  This field typically points to a structure that is used while
    accessing the wordlist, and must be unique to each word list. */
```

```
104      STATIC VOID
105      pathdel(access)
106      char    *access;              /* the entry to delete */
107   1  {
108   1      register SPENTRY *delptr;     /* pointer into the searchpath */
109   1
110   1      /* ... */
111   1              entries which are past it up one entry. */
112   1
113   1      delptr = Srchend;
114   2      while (--delptr )= Srchpath) {
115   2          if (delptr->sp_access == access
116   3          && delptr->sp_envcode == getscenv()) {
117   3              --Srchend;
118   3              scmove(delptr, delptr + 1,
119   3                  sizeof(SPENTRY) * (Srchend - delptr));
120   3              return;
121   2          }
122   1      }
123   1      /* The structure was not found, so do nothing. */
124   }
125
126      LEX *
127      lexopen(idcode, flags, fname)
128      int     idcode;               /* Identifier for this word list */
129      int     flags;                /* Searchpath flags */
130      char    *fname;               /* Name of file containing lexicon */
131   1  {
132   1      extern LEX *lexalloc();
133   1      LEX     *access;
134   1
135   2      if (!pathadd(flags, idcode, IW_LEX )) & ERR_LEX)) {
136   2          return (NULL);
137   1      }
138   1      access = lexalloc(fname);
139   2      if (flags && access) {
140   2          Srchend++->sp_access = (char *)access;
141   1      }
142   1      return (access);
143   }
144
145      VOID
146      lexclose(lexptr)
147      LEX     *lexptr;
148   1  {
149   1      pathdel((char *)lexptr);
150   }
151
152      int
153      setenglish()
154   1  {
155   1      extern VOID setcurenv();
156   1
157   1      setcurenv(&Engenv);
158   1      return (OKAY);
159   }
```

| Inflect.C |          | 1  | 1   |
|-----------|----------|----|-----|
| Inflect.C | isvowel  | 1  | 27  |
| Inflect.C | inflect  | 1  | 31  |
| Inflect.C | iplural  | 5  | 235 |
| Inflect.C | ido_ly   | 8  | 398 |
| Inflect.C | inormend | 9  | 447 |
| Inflect.C | ido_ment | 10 | 549 |
| Inflect.C | ido_able | 11 | 567 |
| Inflect.C | alttry   | 13 | 677 |
| Inflect.C | ido_est  | 13 | 703 |
| Inflect.C | appndstr | 15 | 785 |
| Inflect.C |          | 15 | 811 |

```
 1   /*********************************************************************\
 2
 3       Product Number: SC-50-5.7
 4
 5       Version: rev5.7
 6
 7       Product Name: Spelling Components - Thesaurus
 8
 9       Filename: inflect.c
10
11
12       This document contains private and confidential information and
13       its disclosure does not constitute publication.  Some of the
14       information herein also may appear in United States and or
15       Foreign Patents Pending.  All rights are reserved by Proximity
16       Technology Inc., except those specifically granted by license.
17
18   \*********************************************************************/
19
20   #include "thesmisc.h"
21
22   #ifdef DEBUG
23   extern int debug;
24   #endif
25
26   #define VMASK    0x1104111
27   #define isvowel(c)      ((1 << (c - 'a')) & VMASK)        /* aeiouy */
28
29   static END *Infstgptr;
30
```

```
31      inflect(source, str, posflag, sp)
32      UCHAR   *source;            /* string to inflect */
33      UCHAR   *str;               /* inflected string */
34      int     posflag;            /* the word to be inflected is a noun or verb */
35      END     *sp;                /* inflection stage pointer. */
36   1  {
37   1
38   1      static UCHAR *endptr;
39   1      static   UCHAR    *tmpptr;
40   1      static   UCHAR    *start;
41   1      static   UCHAR    *endstr;
42   1      static   int      infindex;
43   1      static   short    unfrel;
44   1      static   UCHAR    past[MAXWORD];
45   1      static   UCHAR    pp[MAXWORD];
46   1      static   UCHAR    dummy[MAXWORD];
47   1      static   UCHAR    rtstr[MAXWORD];
48   1
49   2      if ((Infstgptr = sp) == NULL) {
50   2          return (FALSE);
51   1      }
52   1      endstr = (UCHAR *)Infstgptr->en_end;
53   1
54   1      /* If the string is a phrase, it should be either a verb or a noun.
55   1         If it is a verb, inflect the first word
56   1         if it is a noun, inflect the last word.
57   1      */
58   1
59   1      unfrel = Infstgptr->en_rel;
60   1      strcpy(str, source);
61   2      if (unfrel == TP_SP || unfrel == TP_FP) {
62   2          return (TRUE);
63   1      }
64   1      endptr = start = str;
65   2      while (*endptr && *endptr != ' ') {
66   2          ++endptr;
67   1      }
68   1      *rtstr = '\0';
69   2      if (*endptr == ' ') {
70   3          if ((infindex = unfexc(source, dummy, unfrel)) != ERROR) {
71   4              if (infindex == 0) {
72   4                  return (FALSE);
73   3              }
74   3              strcpy(str, dummy);
75   3              return (TRUE);
76   2          }
77   2          tmpptr = endptr++;
78   2
79   3          switch (unfrel) {
80   3              case AJ_NN:
81   3              case VB_NN:
82   3              case AJ_AV:
83   3              case VB_AJ:
84   3                  return (FALSE);
85   3              default:
86   3                  break;
87   2          }
88   2
89   3          if (posflag == VERB) {
90   3              endptr = tmpptr;
91   3              strcpy(rtstr, endptr);
92   3              *endptr = '\0';
93   3          } else if (posflag == NOUN) {
94   3              str = tmpptr + 1;
95   4              while (*endptr) {
96   5                  if (*endptr == ' ') {
97   5                      str = endptr + 1;
98   4                  }
99   4                  ++endptr;
100  3              }
101  3          } else {
102  3              return (FALSE);
103  2          }
104  1      }
105  1
106  1      /* See if it is an exception. If we have a pluralizing relation
107  1         take exceptions only if noun is indicated. */
108  1
109  2      if (posflag == NOUN || unfrel != SI_PL) {
110  3          if (unfrel == PR_PS || unfrel == PR_PP) {
111  4              if ((infindex = unfexc(str, str, PR_PX)) > 0) {
112  4                  appndstr(str, rtstr, INFCODE);
113  4                  return (TRUE);
114  3              }
115  2          }
116  3          if ((infindex = unfexc(str, str, unfrel)) != ERROR) {
117  4              if (infindex == 0) {
118  4                  return (FALSE);
119  3              }
120  3              appndstr(str, rtstr, INFCODE);
121  3              return (TRUE);
122  3          } else if (unfrel == SV_PX) {
123  3              unfrel = PR_PX;
124  4              if ((infindex = unfexc(str, str, unfrel)) > 0) {
125  4                  appndstr(str, rtstr, INFCODE);
126  4                  return (TRUE);
127  3              }
128  3          } else if (unfrel == SP_PL) {
129  3              unfrel = SI_PL;
130  4              if ((infindex = unfexc(str, str, unfrel)) > 0) {
131  4                  appndstr(str, rtstr, INFCODE);
132  4                  return (TRUE);
133  3              }
```

```
134 2            }
135 1        }
136 1
137 1        /* Take care of the ambiguous past/past participle forms */
138 1
139 2        if (unfrel == PR_PX) {
140 2
141 2            /* Find the past tense */
142 2
143 2            endptr = strcpy(past, str);
144 3            if ((infindex = unfexc(past, dummy, PR_PS)) != ERROR) {
145 4                if (infindex != 0) {
146 4                    strcpy(past, dummy);
147 3                }
148 3                appndstr(past, rtstr, INFCODE);
149 3            } else {
150 4                if (!inormend(past, endptr, endstr)) {
151 4                    return (FALSE);
152 3                }
153 3                endptr = strcpy(str, past);
154 3                appndstr(str, rtstr, INFCODE);
155 4                if ((infindex = unfexc(str, dummy, UNF_IR)) == 0) {
156 4                    return (FALSE);
157 3                }
158 3                return (TRUE);
159 2            }
160 2
161 2            /* Find the past participle */
162 2
163 2            endptr = strcpy(pp, str);
164 3            if ((infindex = unfexc(pp, dummy, PR_PP)) > 0) {
165 3                endptr = strcpy(pp, dummy);
166 3                appndstr(pp, rtstr, INFCODE);
167 3            } else {
168 3                strcpy(pp, past);
169 2            }
170 2
171 2            /* If the past and pp forms are different
172 2               construct (past)/(pp). */
173 2
174 3            if (strucmp(pp, past) != 0) {
175 3                endptr = strcpy(str, past);
176 3                *endptr++ = UNFSEP;
177 3                strcpy(endptr, pp);
178 3                return (TRUE);
179 2            }
180 2            strcpy (str, past);
181 2            return (TRUE);
182 1        }
183 1
184 2        switch (Infstgptr->en_class) {
185 2
186 2            case 0:                  /* s */
187 3                if (!iplural(str, endptr, posflag)) {
188 3                    return (FALSE);
189 2                }
190 2                break;
191 2            case 1:
192 3                if (!ido_ly(str, endptr, endstr)) {
193 3                    return (FALSE);
194 2                }
195 2                break;
196 2            case 2:
197 2            case 3:
198 3                if (unfrel == RE_CM || unfrel == RE_SU) {    /* er/est */
199 4                    if (!ido_est(str, endptr, endstr)) {
200 4                        return (FALSE);
201 3                    }
202 3                } else if (!inormend(str, endptr, endstr)) {
203 3                    return (FALSE);
204 2                }
205 2                break;
206 2            case 4:
207 3                if (!ido_ment(str, endptr, endstr)) {
208 3                    return (FALSE);
209 2                }
210 2                break;
211 2            case 5:
212 2                if (!ido_able(str,endptr, (UCHAR *)"able")
213 3                    || strlen((char *)str) < 6) {
214 3                    return (FALSE);
215 2                }
216 2                break;
217 2            case 6:
218 2            case 7:
219 2            case 8:
220 2            case 9:
221 3                if (!iplural(str, endptr, posflag)) {
222 3                    return (FALSE);
223 2                }
224 2                break;
225 2            default:
226 2                return (FALSE);
227 1        }
228 1        appndstr(str, rtstr, INFCODE);
229 2        if ((infindex = unfexc(start, dummy, UNF_IR)) == 0) {
230 2            return (FALSE);
231 1        }
232 1        return (TRUE);
233     }
234
235     iplural(str, endptr, pos)
236     register UCHAR *str;
```

```
237      register UCHAR *endptr;
238      int     pos;
239  1
240  1   {
         static   UCHAR   end1[MAXWORD];
241  1   static   UCHAR   end2[MAXWORD];
242  1
243  2   switch (endptr[-1]) {
244  2
245  2       case 'y':                       /* toy -> toys */
246  2           *endptr = 's';
247  2           endptr[1] = '\0';
248  3           if (unftry(str)) {
249  3               return (TRUE);
250  2           }
251  2           endptr[-1] = 'i';           /* candy -> candies */
252  2           *endptr++ = 'e';
253  2           break;
254  2
255  2       case 'h':
256  2           *endptr = 's';              /* bath -> baths */
257  2           endptr[1] = '\0';
258  3           if (unftry(str)) {
259  3               return (TRUE);
260  2           }
261  2           *endptr++ = 'e';            /* fish -> fishes */
262  2           break;
263  2
264  2       case 's':                       /* crisis -> crises */
265  3           if (endptr[-2] == 'i' && endptr[-3] == 's') {
266  3               endptr[-2] = 'e';
267  3               *endptr = '\0';
268  4               if (unftry(str)) {
269  4                   return (TRUE);
270  3               }
271  3               endptr[-2] = 'i';
272  2           }
273  3           if (endptr[-2] == 'u' && pos == NOUN) { /* focus -> foci */
274  3               endptr[-2] = 'i';
275  3               endptr[-1] = '\0';
276  4               if (unftry(str)) {
277  4                   return (TRUE);
278  3               }
279  3               endptr[-2] = 'u';
280  3               endptr[-1] = 's';
281  2           }
282  2           strcpy(endptr, (UCHAR *)"ses");     /* gas -> gasses */
283  3           if (unftry(str)) {
284  3               return (TRUE);
285  2           }
286  2           *endptr++ = 'e';
287  2           break;
288  2
289  2       case 'x':
290  3           if ((endptr[-2] == 'i' || endptr[-2] == 'e') && pos == NOUN) {
291  3               end1[0] = endptr[-2];
292  3               strcpy(&end1[1], (UCHAR *)"xes");
293  3               strcpy(end2, end1);
294  3               end2[0] = 'i';
295  3               end2[1] = 'c';
296  3               return (alttry(str, endptr-2, end1, end2));
297  3           }
298  3           /* vertex -> vertexes or vertices */
299  2
300  2           *endptr++ = 'e';            /* box -> boxes */
301  2           *endptr++ = 's';
302  2           *endptr = '\0';
303  3           if (!unftry(str)) {
304  3               *str = '\0';
305  3           } else {
306  3               return (TRUE);
307  2           }
308  2       case 'u':                       /* plateau -> plateaus or plateaux*/
309  2           end1[0] = 's';
310  2           end2[0] = 'x';
311  2           end1[1] = end2[1] = '\0';
312  2           return (alttry(str, endptr, end1, end2));
313  2
314  2       case 'z':
315  2           strcpy(endptr, (UCHAR *)"zes");     /* quiz -> quizzes */
316  3           if (unftry(str)) {
317  3               return (TRUE);
318  2           }
319  2           *endptr++ = 'e';            /* buzz -> buzzes */
320  2           break;
321  2
322  2       case 'f':                       /* puff -> puffs */
323  3           if (endptr[-2] != 'f') {    /* carafe -> carafes */
324  3               *endptr++ = 's';
325  3               *endptr = '\0';
326  4               if (unftry(str)) {
327  4                   return (TRUE);
328  3               }
329  3               endptr -= 2;            /* loaf -> loaves */
330  3               *endptr++ = 'v';
331  3               *endptr++ = 'e';
332  2           }
333  2           break;
334  2
335  2       case 'e':
336  3           if (endptr[-3] == 'e' && endptr[-2] == 's') {
337  3               return (TRUE);
338  2           }
339  2           *endptr = 's';
340  2           endptr[1] = '\0';
```

```
341  3              if (unftry(str)) {
342  3                  return (TRUE);
343  2              }
344  3              if (endptr[-2] == 'f') {           /* life -> lives */
345  3                  endptr[-2] = 'v';
346  4                  if (unftry(str)) {
347  4                      return (TRUE);
348  3                  }
349  2              }
350  2              return (FALSE);
351  2
352  2          case 'o':
353  3              if (pos == VERB && !isvowel(endptr[-2])) {
354  3                  *endptr = 'e';
355  3                  endptr[1] = 's';
356  3                  endptr[2] = '\0';
357  4                  if (unftry(str)) {             /* do -> does */
358  4                      return (TRUE);
359  3                  }
360  3              } else {
361  3                  end1[0] = 'e';
362  3                  end1[1] = 's';
363  3                  end2[0] = 's';
364  3                  end1[2] = end2[1] = '\0';
365  3                  return (alttry(str, endptr, end1, end2));
366  2              }
367  2              break;
368  2
369  2          case 'n':
370  3              if (endptr[-2] == 'a' && endptr[-3] == 'm') {
371  3                  endptr[-2] = 'e';              /* man -> men */
372  4                  if (unftry(str)) {
373  4                      return (TRUE);
374  3                  }
375  3                  endptr[-2] = 'a';              /* human -> humans */
376  2              }
377  2              break;
378  2
379  2          case 'm':
380  3              if (endptr[-2] == 'u' && pos == NOUN) {
381  3                  end1[0] = 'u';
382  3                  end1[1] = 'm';   /* medium -> mediums or media */
383  3                  end1[2] = 's';
384  3                  end2[0] = 'a';
385  3                  end1[3] = end2[1] = '\0';
386  3                  return (alttry(str, endptr-2, end1, end2));
387  2              }
388  2              break;
389  2
390  2          default:
391  2              break;
392  1          }
393  1          *endptr++ = 's';                       /* (word) -> (word)s */
394  1          *endptr = '\0';
395  1          return (unftry(str));
396      }
397
398      ido_ly(str, endptr, ending)
399      register UCHAR *str;
400      register UCHAR *endptr;
401      register UCHAR *ending;
402  1   {
403  2          switch (endptr[-1]) {
404  2
405  2          case 'y':                              /* ready -> readily */
406  2              endptr[-1] = 'i';
407  2              strcpy(endptr, ending);
408  3              if (unftry(str)) {
409  3                  return (TRUE);
410  2              }
411  2              endptr[-1] = 'y';        /* gay -> gayly */
412  2              return (unftry(str));
413  2          case 'l':                              /* accidental -> accidentally */
414  3              if (endptr[-2] == 'l') {
415  3                  --endptr;
416  2              }
417  2              break;
418  2          case 'e':
419  3              if (endptr[-2] == 'l' && endptr[-3] == 'b') {
420  3                  endptr[-1] = 'y';              /* able -> ably */
421  3                  *endptr = '\0';
422  4                  if (unftry(str)) {
423  4                      return (TRUE);
424  3                  }
425  2              }
426  2              break;
427  2          case 'c':
428  2              strcpy(endptr, ending);            /* impolitic -> impoliticly */
429  3              if (unftry(str)) {
430  3                  return (TRUE);
431  2              }
432  3              if (endptr[-2] == 'i' || endptr[-2] == 'a') {
433  3                  strcpy(endptr, (UCHAR *)"ally");
434  4                  if (unftry(str)) {    /* athletic -> athletically */
435  4                      return (TRUE);
436  3                  }
437  2              }
438  2              return (FALSE);
439  2          default:
440  2              break;
441  1          }
442  1
443  1          strcpy(endptr, ending);                /* (word) -> (word)ly */
444  1          return (unftry(str));
```

```
445         }
446
447         inormend(str, endptr, ending)
448         register UCHAR *str;
449         register UCHAR *endptr;
450         UCHAR    *ending;
451   1   {
452   1
453   1       static   UCHAR   end1[MAXWORD];     /* the two endings used to generate */
454   1       static   UCHAR   end2[MAXWORD];     /* alternative forms */
455   1
456   2       if (Infstgptr->en_rel == AJ_NN) {
457   2           strecpy(endptr, ending);
458   3           if (unftry(str)) {
459   3               return (TRUE);             /* busy -> busyness */
460   2           }
461   3           if (endptr[-1] == 'y') {
462   3               endptr[-1] = 'i';
463   3               return (unftry(str));
464   2           }
465   2           return (FALSE);
466   1       }
467   1
468   2       switch (endptr[-1]) {
469   2
470   2           case 'y':
471   2               endptr[-1] = 'i';
472   2               strecpy(endptr, ending);
473   3               if (unftry(str)) {
474   3                   return (TRUE);
475   2               }
476   2               endptr[-1] = 'y';            /* cry -> cried */
477   2               break;
478   2
479   2           case 'e':
480   3               if (Infstgptr->en_rel == PR_PC) {
481   4                   if (endptr[-2] == 'i') {
482   4                       endptr -= 2;
483   4                       strecpy(strecpy(end2, endptr),ending);
484   4                       end1[0] = 'y';
485   4                       strecpy(end1 + 1, ending);
486   5                       if (alttry(str, endptr, end1, end2)) {
487   5                           return (TRUE);
488   4                       }
489   4                       endptr += 2;
490   4                   } else if (endptr[-2] == 'y') {
491   4                       strecpy(endptr, ending); /* eye -> eyeing */
492   5                       if (unftry(str)) {
493   5                           return (TRUE);
494   4                       }
495   3                   }
496   2               }
497   2               endptr--;                    /* able -> abling */
498   2               strecpy(endptr, ending);
499   3               if (unftry(str)) {
500   3                   return (TRUE);
501   2               }
502   2               *endptr++ = 'e';
503   2               break;
504   2           case 'a':
505   2           case 'i':
506   2           case 'o':
507   2           case 'u':
508   2               break;
509   2           case 'h':
510   2               strecpy(endptr, ending);
511   3               if (unftry(str)) {
512   3                   return (TRUE);
513   2               }
514   2               break;
515   2           case 'c':                        /* panic -> panicking */
516   3               if (endptr[-2] == 'a' || endptr[-2] == 'i') {
517   3                   *endptr++ = 'k';
518   3                   strecpy(endptr, ending);
519   4                   if (unftry(str)) {
520   4                       return (TRUE);
521   3                   }
522   2               }
523   2               endptr--;
524   2               break;
525   2           case 'l':                        /* level -> leveled or levelled */
526   2               strecpy(end1, ending);
527   2               end2[0] = endptr[-1];
528   2               strecpy(&end2[1], ending);
529   2               return (alttry(str, endptr, end1, end2));
530   2           case 's':
531   2               strecpy(endptr, ending);
532   3               if (unftry(str)) {
533   3                   return (TRUE);
534   2               }
535   2           default:
536   2               *endptr = endptr[-1];
537   2               endptr++;
538   2               strecpy(endptr, ending);
539   3               if (unftry(str)) {
540   3                   return (TRUE);
541   2               }
542   2               endptr--;
543   2               break;
544   1       }
545   1       strecpy(endptr, ending);
546   1       return (unftry(str));
547       }
548
549       ido_ment(str, endptr, ending)
550       register UCHAR *str;
```

```
551       register UCHAR *endptr;
552       register UCHAR *ending;
553   1   {
554   1       strecpy(endptr, ending);          /* (word) -> (word)ment */
555   2       if (unftry(str)) {
556   2           return (TRUE);
557   1       }
558   1       *endptr = '\0';                    /* acknowledge -> acknowledgment */
559   2       if (strucmp(&endptr[-3], (UCHAR *)"dge") == 0) {
560   2           strecpy(&endptr[-1], ending);
561   2           return(unftry(str));
562   1       }
563   1
564   1       return (FALSE);
565       }
566
567       ido_able(str, endptr, ending)
568       register UCHAR *str;
569       register UCHAR *endptr;
570       register UCHAR *ending;
571   1   {
572   1       static  UCHAR   altend[MAXWORD];
573   1
574   1       strecpy(altend, ending);
575   1       altend[0] = 'i';
576   1
577   2       if (endptr[-1] == endptr[-2]) {
578   2           strecpy(endptr, ending);
579   2           return (unftry(str));
580   1       }
581   1
582   2       switch (endptr[-1]) {
583   2           case 'y':
584   2               endptr[-1] = 'i';              /* try -> triable */
585   2               strecpy(endptr, ending);
586   3               if (unftry(str)) {
587   3                   return (TRUE);
588   2               }
589   2               endptr[-1] = 'y';
590   2               break;
591   2           case 'd':
592   2               *endptr = endptr[-1];
593   2               strecpy(&endptr[1], ending);
594   3               if (unftry(str)) {
595   3                   return (TRUE);
596   2               }
597   2               strecpy(endptr, altend);       /* extend -> extendible */
598   3               if (unftry(str)) {
599   3                   return (TRUE);
600   2               }
601   2               endptr[-1] = 's';              /* defend -> defensible */
602   3               if (unftry(str)) {
603   3                   return (TRUE);
604   2               }
605   2               endptr[-1] = 'd';
606   2               strecpy(endptr, ending);
607   2               return (unftry(str));
608   2           case 't':
609   2               *endptr = endptr[-1];          /* rebut -> rebuttable */
610   2               strecpy(&endptr[1], ending);
611   3               if (unftry(str)) {
612   3                   return (TRUE);
613   2               }
614   3               if (endptr[-2] == 'i') {       /* permit -> permissible */
615   3                   endptr[-1] = 's';
616   3                   *endptr    = 's';
617   3                   strecpy(&endptr[1], altend);
618   4                   if (unftry(str)) {
619   4                       return (TRUE);
620   3                   }
621   3                   endptr[-1] = 't';
622   2               }
623   2               strecpy(endptr, altend);
624   3               if (unftry(str)) {
625   3                   return (TRUE);
626   2               }
627   2               strecpy(endptr, ending);
628   2               return (unftry(str));
629   2           case 'b':                          /* recall -> recallable */
630   2           case 'f':
631   2           case 'g':
632   2           case 'l':
633   2           case 'm':
634   2           case 'n':
635   2           case 'p':
636   2           case 'r':
637   2               *endptr = endptr[-1];
638   2               strecpy(&endptr[1], ending);
639   3               if (unftry(str)) {
640   3                   return (TRUE);
641   2               }
642   2               strecpy(endptr, ending);
643   2               return (unftry(str));
644   2           case 'e':
645   2               strecpy(&endptr[-1], ending);  /* repute -> reputable */
646   3               if (unftry(str)) {
647   3                   return (TRUE);
648   2               }
649   2               strecpy(&endptr[-1], altend);
650   3               if (unftry(str)) {
651   3                   return (TRUE);
652   2               }
653   3               if (endptr[-3] == 'a' && endptr[-2] == 't') {
654   3                   strecpy(&endptr[-3], ending);
```

```
655  4                      if (unftry(str)) {
656  4                          return (TRUE);
657  3                      }
658  3                      endptr[-2] = 't';
659  2                  }
660  2                  endptr[-1] = 'e';
661  2                  strcpy(endptr, ending);        /* change -> changeable */
662  2                  return (unftry(str));
663  2              default:
664  2                  break;
665  1          }
666  1          strcpy(endptr, ending);                /* (word) -> (word)able */
667  2          if (unftry(str)) {
668  2              return (TRUE);
669  1          }
670  1          strcpy(endptr, altend);                /* (word) -> (word)ible */
671  1          return (unftry(str));
672      }
673
674      /* Try alternative inflected forms. Return a string containing
675         the acceptable inflection(s) separated by UNFSEP */
676
677      alttry(str, endptr, end1, end2)
678      register UCHAR *str;
679      register UCHAR *endptr;
680      UCHAR    *end1;
681      UCHAR    *end2;
682  1   {
683  1       static   UCHAR    tmpstr[MAXWORD];
684  1
685  1       *endptr = '\0';
686  1       strcpy(strcpy(tmpstr, str), end2);
687  1       endptr = strcpy(endptr, end1);
688  2       if (unftry(str)) {
689  2           *endptr++ = UNFSEP;
690  2       } else {
691  2           endptr = str;
692  1       }
693  1       strcpy(endptr, tmpstr);
694  2       if (!unftry(endptr)) {
695  3           if (endptr != str) {
696  3               endptr--;
697  2           }
698  2           *endptr = '\0';
699  1       }
700  1       return (*str != '\0');
701      }
702
703      ido_est(str, endptr, ending)
704      register UCHAR *str;
705      register UCHAR *endptr;
706      register UCHAR *ending;
707  1   {
708  1
709  1       static   UCHAR    end1[MAXWORD];
710  1       static   UCHAR    end2[MAXWORD];
711  1       static   UCHAR    altend[MAXWORD];
712  1       static   UCHAR    prefix[MAXWORD];
713  1
714  2       if (Infstgptr->en_rel == RE_CM) {
715  2           strcpy(altend, (UCHAR *)"est");
716  2           strcpy(prefix, (UCHAR *)"more ");
717  2       } else {
718  2           strcpy(altend, (UCHAR *)"er");
719  2           strcpy(prefix, (UCHAR *)"most ");
720  1       }
721  1
722  2       switch (endptr[-1]) {
723  2
724  2           case 'y' :
725  2               endptr[-1] = 'i';
726  2               strcpy(endptr, altend);
727  3               if (unftry(str)) {
728  3                   strcpy(endptr, ending);
729  4                   if (unftry(str)) {
730  4                       return (TRUE);
731  3                   }
732  2               }
733  2               endptr[-1] = 'y';
734  2               break;
735  2           case 'e':
736  2               endptr--;
737  2               strcpy(endptr, altend);
738  3               if (unftry(str)) {
739  3                   strcpy(endptr, ending);
740  4                   if (unftry(str)) {
741  4                       return (TRUE);
742  3                   }
743  2               }
744  2               *endptr++ = 'e';
745 -2               break;
746  2           case 'l':
747  2               strcpy(endptr, altend);
748  3               if (unftry(str)) {
749  3                   strcpy(end1, ending);
750  3                   end2[0] = 'l';
751  3                   strcpy(&end2[1], ending);
752  3                   return (alttry(str, endptr, end1, end2));
753  2               }
754  2           default:
755  2               *endptr = endptr[-1];
756  2               endptr++;
757  2               strcpy(endptr, altend);
758  3               if (unftry(str)) {
759  3                   strcpy(endptr, ending);
760  4                   if (unftry(str)) {
```

```
761   4                        return (TRUE);
762   3                   }
763   2              }
764   2              *--endptr = '\0';
765   2              break;
766   1          }
767   1      }
768   1      strcpy(endptr, altend);
769   2      if (unftry(str)) {
770   2          _strcpy(endptr, ending);
771   3          if (unftry(str)) {
772   3              return (TRUE);
773   2          }
774   1      }
775   1      *endptr = '\0';
776   1      strcpy(strend(prefix), str);
777   1      strcpy(str, prefix);
778   1      return (TRUE);
779   }
780
781   /* Append rtstr to each word in str (separated by UNFSEP) */
782
783   int cappend;
784
785   appndstr(str, rtstr, code)
786   UCHAR   *str;
787   UCHAR   *rtstr;
788   int     code;
789  1 {
790  1
791  1     static   UCHAR *tmpptr;
792  1     static   UCHAR *strptr;
793  1     static   UCHAR tmpstr[LONGWORD];
794  1
795  1     cappend++;
796  1     strptr = str;
797  1     tmpptr = tmpstr;
798  2     while (*strptr != '\0') {
799  3         if (*strptr == UNFSEP) {
800  4             if (*rtstr != '\0') {
801  4                 tmpptr = strcpy(tmpptr, rtstr);
802  3             }
803  4             if (code == INFCODE) {
804  4                 *strptr = INFSEP;
805  3             }
806  2         }
807  2         *tmpptr++ = *strptr++;
808  1     }
809  1     strcpy(tmpptr, rtstr);
810  1     strcpy(str, tmpstr);
811      }
```

```
                         CONTENTS
                      Page   Line 01-02-88 12:35:44
Unflect.C                    1      1
Unflect.C    isvowel         1     27
Unflect.C    unflect         2     68
Unflect.C    unfword         2     87
Unflect.C    cutoff1         6    283
Unflect.C    uplural         6    299
Unflect.C    udo_ness        8    415
Unflect.C    udo_ly          8    430
Unflect.C    unormend        9    472
Unflect.C    udo_ment       12    614
Unflect.C    udo_able       12    630
Unflect.C    unfstage       13    692
Unflect.C    chkmultunf     13    712
Unflect.C    multunftry     14    743
Unflect.C    unfphrase      15    772
Unflect.C    removunf       16    864
Unflect.C                   16    877
```

```
1    /*********************************************************************\
2
3        Product Number: SC-50-5.7
4
5        Version: rev5.7
6
7        Product Name: Spelling Components - Thesaurus
8
9        Filename: unflect.c
10
11
12       This document contains private and confidential information and
13       its disclosure does not constitute publication.  Some of the
14       information herein also may appear in United States and or
15       Foreign Patents Pending.  All rights are reserved by Proximity
16       Technology Inc., except those specifically granted by license.
17
18   \*********************************************************************/
19
20   #include "thesmisc.h"
21
22   #ifdef DEBUG
23   extern int debug;
24   #endif
25
26   #define VMASK    0x1104111
27   #define isvowel(c)        ((1 << (c - 'a')) & VMASK)        /* aeiouy */
28
29   static END *Unfstgptr;
30
31   /* the switch in unftry() will use the third member to proceed */
32   /* use this member if adding additional endings */
33   /* The ordering of endings is crucial in determining the precedence */
34   /* of endings */
```

```
35      /* the TH_ initialization is to give the part of speech of the root */
36      /* form and the fifth member is the relationship between */
37      /* root to its inflection. */
38
39  1   static END Stage[] = {
40  1       {"ness",        4,      2,      TH_ADJITH_ADJSP,AJ_NN},
41  1       {"ment",        4,      4,      TH_VERBITH_VERBSP,VB_NN},
42  1       {"able",        4,      5,      TH_VERBITH_VERBSP,VB_AJ},
43  1       {"ible",        4,      5,      TH_VERBITH_VERBSP,VB_AJ},
44  1       {"ments",       5,      4,      TH_VERBITH_VERBSP,VB_NN},
45  1       {"s",           1,      0,      TH_NOUNITH_VERBITH_VERBSP,SI_PL},
46  1       {"s",           1,      0,      TH_NOUN,SI_PL},
47  1       {"s",           1,      0,      TH_SPNOUN,SP_PL},
48  1       {"s",           1,      0,      TH_VERBITH_VERBSP,TP_SI},
49  1       {"a",           1,      7,      TH_NOUN,SI_PL},
50  1       {"men",         3,      6,      TH_NOUN,SI_PL},
51  1       {"i",           1,      8,      TH_NOUN,SI_PL},
52  1       {"x",           1,      9,      TH_NOUN,SI_PL},
53  1       {"ly",          2,      1,      TH_ADJITH_ADJSP,AJ_AV},
54  1       {"ing",         3,      3,      TH_VERBITH_VERBSP,PR_PC},
55  1       {"ed",          2,      3,      TH_VERB,PR_PX},
56  1       {"ed",          2,      3,      TH_VERBSP,SV_PX},
57  1       {"ed",          2,      3,      TH_VERB,PR_PS},
58  1       {"ed",          2,      3,      TH_VERB,PR_PP},
59  1       {"er",          2,      3,      TH_ADJ,RE_CM},
60  1       {"est",         3,      3,      TH_ADJ,RE_SU},
61  1       {"are",         3,      10,     TH_VERB,TP_SP},
62  1       {"am",          2,      10,     TH_VERB,TP_FP},
63  1       {NULL,          0,      0,      0,DN_CR}
64          };
65
66      /* #define static */
67
68      unflect(str, multunf, multstage)
69      register UCHAR  *str;                   /* string to unflect */
70      UCHAR           *multunf[];             /* pointers to unflected strings */
71      END             *multstage[];           /* unflection stages */
72  1   {
73  1
74  1       static UCHAR    *endptr;
75  1
76  1       endptr = str;
77  2       while (*endptr && *endptr != ' ') {
78  2           ++endptr;
79  1       }
80  2       if (*endptr == ' ') {
81  2           return (unfphrase(str, endptr, multunf, multstage));
82  2       } else {
83  2           return (unfword(str, multunf, multstage));
84  1       }
85      }
86
87      unfword(str, multunf, multstage)
88      register UCHAR  *str;                   /* string to unflect */
89      UCHAR           *multunf[];             /* pointers to unflected strings */
90      END             *multstage[];           /* unflection stages */
91  1   {
92  1       END         *cutoff();
93  1       END         *unfstage();
94  1
95  1       static UCHAR    *endptr;
96  1       static int      infindex;
97  1       static UCHAR    *tmpptr;
98  1       static int      stageind;
99  1       static int      tmpind;
100 1       static UCHAR    dummy[MAXWORD];
101 1       static UCHAR    tmpstr[MAXWORD];
102 1
103 1       strcpy(tmpstr, str);
104 1
105 1       stageind = 0;
106 1       endptr   = str;
107 1
108 1       /* see if the word is an exception */
109 1       /* if a singular to plural is indicated, it is for a noun */
111 2       if ((infindex = unfexc(str, dummy, UNF_IR)) != ERROR) {
112 3           if (infindex == 0) {
113 3               return (FALSE);
114 3           }
115 2           strcpy(str, dummy);
116 2
117 3           if (infindex == PR_PS + 1) {
118 4               if (unfexc(tmpstr,tmpstr,PR_PP + 1) > 0) {
119 4                   infindex = PR_PX + 1;
120 3               }
121 2           }
122 3           if ((Unfstgptr = unfstage(infindex)) == NULL) {
123 3               return (FALSE);
124 2           }
125 2           endptr   = strend(str);
126 2           stageind = chkmultunf(str, multstage, multunf, stageind);
127 2           tmpptr   = strend(tmpstr) - 1;
128 2           if ((infindex == SI_PL + 1 || infindex == SP_PL + 1)
129 3               && *tmpptr == 's') {
130 3               *tmpptr = '\0';
131 4               if (infindex == SI_PL + 1) {
132 4                   Unfstgptr += 2;
133 4               } else {
134 4                   Unfstgptr -= 2;
135 3               }
136 4               if (uplural(tmpstr, tmpptr)) {
137 4                   endptr++;
138 4                   strcpy(endptr, tmpstr);
139 4                   multunf[stageind] = endptr;
140 4                   multstage[stageind++] = Unfstgptr;
```

```
141  3              }
142  2           }
143  2           multstage[stageind] = NULL;
144  2
145  2           return (TRUE);
146  1      }
147  2      if ((Unfstgptr = cutoff1(endptr = strend(str))) == NULL) {
148  2           return (FALSE);
149  1      }
150  1      endptr -= Unfstgptr->en_len;
151  1      *endptr = '\0';
152  1
153  2      switch (Unfstgptr->en_class) {
154  2
155  2          case 0:           /* s */
156  3              if (!uplural(str, endptr)) {
157  3                  return (FALSE);
158  2              }
159  2          /* a plural form can be third person singular of a verb */
160  2          /* if the noun plural is in the exceptions, it can only */
161  2          /* be a verb. */
162  2
163  3              if ((infindex = unfexc(str, dummy, SI_PL)) > 0) {
164  3                  Unfstgptr = unfstage(TP_SI + 1);
165  2              }
166  2              break;
167  2
168  2          case 1:           /* ly */
169  3              if (!udo_ly(str, endptr)) {
170  3                  return (FALSE);
171  2              }
172  2              break;
173  2
174  2          case 2:
175  3              if (!udo_ness(str, endptr)) {
176  3                  return (FALSE);
177  2              }
178  2              break;
179  2
180  2          case 3:           /* ing, ed, er, est */
181  3              if (!unormend(str, endptr)) {
182  3                  return (FALSE);
183  2              }
184  2              break;
185  2
186  2          case 4:
187  3              if (*(strend((UCHAR *)Unfstgptr->en_end) - 1) != 's') {
188  4                  if (!udo_ment(str,endptr)) {
189  4                      return (FALSE);
190  3                  }
191  3                  break;
192  2              }
193  2
194  2          /* check for both pluralizing relation and verb -> noun */
195  2
196  2              strcpy(dummy, str);
197  2              endptr = strcpy(str, tmpstr) - 1;
198  2              *endptr = '\0';
199  2              strcpy(tmpstr, dummy);
200  3              if (unftry(str)) {
201  3                  multstage[stageind] = unfstage(SI_PL + 1);
202  3                  multunf[stageind++] = str;
203  3                  endptr = strend(endptr) + 1;
204  3              } else {
205  3                  endptr = str;
206  2              }
207  2              tmpptr = strend(tmpstr);
208  3              if (udo_ment(tmpstr, tmpptr)) {
209  3                  strcpy(endptr, tmpstr);
210  3                  multunf[stageind] = endptr;
211  3                  multstage[stageind++] = Unfstgptr;
212  3                  endptr = strend(endptr);
213  2              }
214  2              *endptr = '\0';
215  2              multunf[stageind] = NULL;
216  2              return (*str != '\0');
217  2
218  2          case 5:
219  3              if (!udo_able(str, endptr)) {
220  3                  return (FALSE);
221  2              }
222  2              break;
223  2
224  2          case 6:
225  2              strcpy(endptr, (UCHAR *)"man");   /* (word)men -> (word)man */
226  3              if (!unftry(str)) {
227  3                  return (FALSE);
228  2              }
229  2              break;
230  2          case 7:
231  2              strcpy(endptr, (UCHAR *)"um");    /* stadia -> stadium */
232  3              if (!unftry(str)) {
233  3                  return (FALSE);
234  2              }
235  2              break;
236  2          case 8:
237  2              strcpy(endptr, (UCHAR *)"us");    /* syllabi -> syllabus */
238  3              if (!unftry(str)) {
239  3                  return (FALSE);
240  2              }
241  2              break;
242  2          case 9:
243  3              if (endptr[-1] != 'u' || !unftry(str)) {
244  3                  return (FALSE);              /* plateaux -> plateau */
245  2              }
246  2              break;
247  2          case 10:
```

```
248  3              if (*str != '\0') {              /* am/are -> be */
249  3                  return (FALSE);
250  2              }
251  2              strcpy(str, (UCHAR *)"be");
252  2              break;
253  2          default:
254  2              return (FALSE);
255  1      }
256  1      tmpind = chkmultunf(str, multstage, multunf, stageind);
257  1      multunf[tmpind] = NULL;
258  1
259  1      /* remove unflections that are derived from applying the */
260  1      /* rules if the root form can be derived from the exceptions */
261  1
262  2      if (!stageind) {
263  3          while (stageind < tmpind) {
264  3              infindex = unfexc(multunf[stageind], tmpstr,
265  3                  Unfstgptr->en_rel);
266  4              if (infindex == ERROR && Unfstgptr->en_rel == PR_PX) {
267  4                  infindex = unfexc(multunf[stageind], tmpstr,
268  4                      PR_PS);
269  3              }
270  4              if (infindex > 0) {
271  4                  tmpind--;
272  4                  removunf(&multunf[stageind],
273  4                      &multstage[stageind]);
274  4                  continue;
275  3              }
276  3              stageind++;
277  2          }
278  1      }
279  1      return (multunf[0] != NULL);
280  }
281
282  END *
283  cutoff1(endptr)
284  register UCHAR *endptr;
285  1  {
286  1      static END  *chkptr;
287  1
288  1      chkptr = Stage;
289  2      while (chkptr->en_end != NULL) {
290  2          if (strucmp(endptr - chkptr->en_len,
291  3              (UCHAR *)chkptr->en_end) == 0) {
292  3              return (chkptr);
293  2          }
294  2          chkptr++;
295  1      }
296  1      return (NULL);
297  }
298
299  uplural(str, endptr)
300  register UCHAR *str;
301  register UCHAR *endptr;
302  1  {
303  1
304  2      if (endptr[-1] != 'e') {
305  3          if (endptr[-1] == 's') {            /* kiss -> failure */
306  3              *endptr++ = 's';
307  3              *endptr = '\0';
308  3              return (FALSE);
309  2          }
310  2          return (unftry(str));
311  1      }
312  1
313  2      switch (endptr[-2]) {
314  2
315  2      case 'o':
316  2          endptr[-1] = '\0';
317  3          if (unftry(str)) {                  /* does -> do */
318  3              return (TRUE);
319  2          }
320  2          endptr[-1] = 'e';
321  2          break;
322  2
323  2      case 'i':
324  2          endptr[-2] = 'y';                   /* flies -> fly */
325  2          endptr[-1] = '\0';
326  3          if (unftry(str)) {
327  3              return (TRUE);
328  2          }
329  2          endptr[-2] = 'i';                   /* brownies -> brownie */
330  2          endptr[-1] = 'e';
331  2          return (unftry(str));
332  2
333  2      case 'h':
334  3          if (endptr[-3] != 't') {            /* clothes -> cloth */
335  3              endptr[-1] = '\0';
336  4              if (unftry(str)) {
337  4                  return (TRUE);
338  3              }
339  3              endptr[-1] = 'e';
340  2          }
341  2          return (unftry(str));               /* ache -> aches */
342  2
343  2      case 'x':
344  2          endptr[-1] = '\0';                  /* boxes -> box */
345  2          return (unftry(str));
346  2
347  2      case 's':                               /* classes -> class */
348  3          if (endptr[-3] == endptr[-2]) {
349  3              endptr[-1] = '\0';              /* busses -> buss */
350  4              if (unftry(str)) {
351  4                  return (TRUE);
352  3              }
353  3              endptr[-2] = '\0';
354  3              return (unftry(str));
355  2          }
```

```
356  2              *endptr = '\0';
357  3              if (unftry(str)) {              /* noses -> nose */
358  3                  return (TRUE);
359  2              }
360  2              endptr[-1] = 'i';
361  2              *endptr = 's';
362  2              endptr[1] = '\0';
363  3              if (unftry(str)) {              /* theses -> thesis */
364  3                  return (TRUE);
365  2              }
366  2              endptr[-1] = '\0';
367  2              return (unftry(str));           /* proboscises -> proboscis */
368  2
369  2          case 'z':
370  3              if (endptr[-3] == endptr[-2]) {
371  3                  endptr -= 2;
372  3                  *endptr = '\0';             /* whizzes -> whizz/whiz */
373  3                  return (multunftry(str, endptr,
374  3                      (UCHAR *)"z", (UCHAR *)""));
375  2              }
376  2              endptr[-1] = '\0';
377  3              if (unftry(str)) {
378  3                  return (TRUE);
379  2              }
380  2              endptr[-1] = 'e';
381  2              break;
382  2
383  2          case 'v':
384  3              if (unftry(str)) {              /* shelves -> shelve */
385  3                  return (TRUE);
386  2              }
387  2              endptr[-2] = 'f';               /* halves -> half */
388  2              endptr[-1] = '\0';
389  3              if (unftry(str)) {
390  3                  return (TRUE);
391  2              }
392  2              endptr[-1] = 'e';               /* knives -> knife */
393  2              break;
394  2
395  2          case 'c':
396  3              if (unftry(str)) {              /* vices -> vice */
397  3                  return (TRUE);
398  2              }
399  2              endptr[-2] = 'x';
400  2              endptr[-1] = '\0';
401  3              if (unftry(str)) {              /* matrices -> matrix */
402  3                  return (TRUE);
403  2              }
404  2              endptr[-3] = 'e';
405  2              return (unftry(str));           /* vertices -> vertex */
406  2
407  2          default:
408  2              break;
409  1          }
410  1
411  1      *endptr = '\0';
412  1      return (unftry(str));
413    }
414
415    udo_ness(str, endptr)
416    register UCHAR *str;
417    register UCHAR *endptr;
418  1 {
419  2      if (endptr[-1] == 'i') {                /* readiness -> ready */
420  2          endptr[-1] = 'y';
421  3          if (unftry(str)) {
422  3              return (TRUE);
423  2          }
424  2          endptr[-1] = 'i';
425  1      }
426  1      return (unftry(str));
427    }
428
429
430    udo_ly(str, endptr)
431    register UCHAR *str;
432    register UCHAR *endptr;
433  1 {
434  2      switch (endptr[-1]) {
435  2
436  2      case 'i' :
437  2          endptr[-1] = 'y';                   /* readily -> ready */
438  2          return (unftry(str));
439  2
440  2      case 'l':
441  2      /* accept more than one possible unflection */
442  2      /* e.g. analytically -> analytical/analytic */
443  2
444  3          if (endptr[-2] == 'a' && endptr[-3] == 'c') {
445  3              endptr -= 2;
446  3              *endptr = '\0';
447  3              return (multunftry(str, endptr,
448  3                  (UCHAR *)"al", (UCHAR *)""));
449  2          }
450  2          *endptr = 'l';
451  2          endptr[1] = '\0';
452  3          if (unftry(str)) {                  /* drolly -> droll */
453  3              return (TRUE);
454  2          }
455  2          break;
456  2
457  2      case 'b' :
458  2          strcpy(endptr, (UCHAR *)"le");      /* crumbly -> crumble */
459  3          if (unftry(str)) {
460  3              return (TRUE);
```

```
461  2                  }
462  2                  break;
463  2
464  2              default:
465  2                  break;
466  1          }
467  1          *endptr = '\0';
468  1          return (unftry(str));               /* (word)ly -> (word) */
469    }
470
471
472       unormend(str, endptr)
473       register UCHAR  *str;
474       register UCHAR  *endptr;
475  1    {
476  1
477  1        static UCHAR    end1[MAXWORD];
478  1        static UCHAR    end2[MAXWORD];
479  1
480  2        if (Unfstgptr->en_rel == RE_CM) {
481  2            strcpy(endptr, (UCHAR *)"est");
482  3            if (!unftry(str)) {
483  3                return (FALSE);
484  2            }
485  2        } else if (Unfstgptr->en_rel == RE_SU) {
486  2            strcpy(endptr, (UCHAR *)"er");
487  3            if (!unftry(str)) {
488  3                return (FALSE);
489  2            }
490  1        }
491  1
492  1        *endptr = '\0';
493  1
494  2        switch (endptr[-1]) {
495  2
496  2        case 'i':
497  2            endptr[-1] = 'y';                   /* angriest -> angry */
498  3            if (unftry(str)) {
499  3                return (TRUE);
500  2            }
501  2            endptr[-1] = 'i';
502  2            *endptr++ = 'e';
503  2            *endptr = '\0';                     /* tied -> tie */
504  2            return (unftry(str));
505  2        case 'e':
506  3            if (endptr[-2] == 'e') {            /* seeing -> see */
507  3                return (unftry(str));
508  2            }
509  2            if (!(Unfstgptr->en_pos & TH_ADJ)) {
510  4                if (unftry(str)) {              /* dieing -> die */
511  4                    return (TRUE);
512  3                }
513  2            }
514  2            *endptr++ = 'e';                    /* bared -> bare */
515  2            *endptr = '\0';
516  2            return (unftry(str));
517  2        case 'u':
518  2            *endptr++ = 'e';
519  2            *endptr = '\0';
520  3            if (unftry(str)) {                  /* arguing -> argue */
521  3                return (TRUE);
522  2            }
523  2            endptr[-1] = '\0';
524  2            return (unftry(str));
525  2        case 'y':
526  3            if (Unfstgptr->en_rel == PR_PC) {
527  3                strcpy(end1, (UCHAR *)"ie");
528  3                end2[0] = 'y';
529  3                end2[1] = '\0';
530  3                *--endptr = '\0';
531  4                if (multunftry(str, endptr, end1, end2)) {
532  4                    return (TRUE);
533  3                }
534  3                *endptr++ = 'y';
535  2            }
536  2            end2[0] = 'e';
537  2            end1[0] = end2[1] = '\0';
538  2            return (multunftry(str, endptr, end1, end2));
539  2        case 'o':
540  3            if (Unfstgptr->en_pos & (TH_VERB | TH_VERBSP)) {
541  3                end2[0] = 'e';
542  3                end1[0] = end2[1] = '\0';
543  3                return (multunftry(str, endptr, end1, end2));
544  2            }
545  2        case 'a':
546  2            return (unftry(str));
547  2        case 'h':
548  2            if (endptr[-2] == 't'
549  3                && (Unfstgptr->en_pos & (TH_VERB | TH_VERBSP))) {
550  3                *endptr++ = 'e';
551  3                *endptr = '\0';
552  4                if (unftry(str)) {              /* bathing -> bathe */
553  4                    return (TRUE);
554  3                }
555  3                endptr--;
556  3                *endptr = '\0';
557  2            }
558  3            if (unftry(str)) {                  /* highest -> high */
559  3                return (TRUE);
560  2            }
561  2            *endptr++ = 'e';                    /* lithest -> lithe */
562  2            *endptr = '\0';
563  2            return (unftry(str));
564  2
565  2        case 'k':
566  3            if (endptr[-2] == 'c') {
567  4                if (unftry(str)) {              /* packing -> pack */
568  4                    return (TRUE);
```

```
569  3                  }
570  3                  endptr[-1] = '\0';
571  3                  return (unftry(str));    /* panicking -> panic */
572  2              }
573  2              break;
574  2          case 'b':
575  2          case 'd':
576  2          case 'f':
577  2          case 'g':
578  2          case 'l':
579  2          case 'm':
580  2          case 'n':
581  2          case 'p':
582  2          case 't':
583  3              if (isvowel(endptr[-2]) && strlen((char *)str) < 4) {
584  3                  *endptr = endptr[-1];
585  3                  strcpy(endptr+1, (UCHAR *)"ing");
586  4                  if (unftry(str)) {
587  4                      *endptr = 'e';
588  4                      endptr[1] = '\0';
589  4                      return (unftry(str));    /* bated -> bate */
590  3                  }
591  3                  *endptr = '\0';
592  2              }
593  2              break;
594  2          default:
595  2              break;
         1      }
         1
         1      /* accept more than one possible unflection */
         1      /* e.g. bussing -> buss/bus, lapping -> lapp/lap */
         1
         2      if (endptr[-1] == endptr[-2]) {
         2          end1[0] = endptr[-1];
         2          end2[0] = end1[1] = '\0';
         2          *--endptr = '\0';
         2          return (multunftry(str, endptr, end1, end2));
606  1      }
607  1
608  1      end1[0] = 'e';
609  1      end1[1] = end2[0] = '\0';       /* casting -> caste/cast */
610  1      return (multunftry(str, endptr, end1, end2));
611  }
612
613
614  udo_ment(str, endptr)
615  register UCHAR *str;
616  register UCHAR *endptr;
617  1  {
618  2      if (endptr[-1] != 'a') {
619  3          if (endptr[-1] == 'g' && endptr[-2] == 'd') {
620  3              *endptr++ = 'e';
621  3              *endptr = '\0';           /* acknowledgment -> -ledge */
622  3              return(unftry(str));
623  2          }
624  2          return(unftry(str));
625  1      }
626  1      return (FALSE);
627  }
628
629
630  udo_able(str, endptr)
631  register UCHAR *str;
632  register UCHAR *endptr;
633  1  {
634  2      if (endptr[-1] == endptr[-2]) {
635  3          if (unftry(str)) {
636  3              return(TRUE);
637  2          }
638  3          if (struchr((UCHAR *)"bdfglmnprt", (int)endptr[-1])) {
639  3              endptr[-1] = '\0';
640  3              return (unftry(str));
         2      }
         3      if (endptr[-2] == 's') {
         3          endptr[-2] = 't';
         3          endptr[-1] = '\0';
         4          if (unftry(str)) {         /* permissible -> permit */
         4              return (TRUE);
         3          }
         2      }
         2      return (FALSE);
650  1      }
651  2      if (endptr[-1] == 'i') {
652  2          strcpy(endptr, (UCHAR *)"ate");
653  3          if (unftry(str)) {             /* satiable -> satiate */
654  3              return (TRUE);
655  2          }
656  2          endptr[-1] = 'y';
657  2          *endptr = '\0';
658  2          return (unftry(str));
659  1      }
660  2      if (endptr[-1] == 's') {
661  3          if (endptr[-2] == 'n') {       /* defensible -> defend */
662  3              endptr[-1] = 'd';
663  3              *endptr = '\0';
664  4              if (unftry(str)) {
665  4                  return (TRUE);
666  3              }
667  3              endptr[-1] = 's';
668  2          }
669  2          *endptr = 'e';
670  2          endptr[1] = '\0';
671  2          return (unftry(str));
672  1      }
673  2      if (struchr((UCHAR *)"cglnr", (int)endptr[-1])) {
674  2          strcpy(endptr, (UCHAR *)"ate");  /* venerable -> venerate */
675  3          if (unftry(str)) {
```

```
676  3                    return (TRUE);
677  2                }
678  2                *endptr = '\0';
679  3                if (unftry(str)) {
680  3                    return (TRUE);
681  2                }
682  1            }
683  1
684  2            if (endptr - str )= 3) {
685  2                return (multunftry(str, endptr, (UCHAR *)"e", (UCHAR *)""));
686  2            } else {
687  2                return (unftry(str));
688  1            }
         }

END *
         unfstage(index)
         register int     index;
694  1   {
695  1       static int    i;
696  1
697  1       /* the index to search is root->inflection */
698  1       /* so subtract 1 */
699  1
700  1       --index;
701  2       for (i = 0; Stage[i].en_end != NULL; i++) {
702  3           if (Stage[i].en_rel == index) {
703  3               return (index == SI_PL ? &Stage[i + 1] : &Stage[i]);
704  2           }
705  1       }
706  1       return NULL;
707      }
708
709      /* check the string for multiple unflections */
710
711
712      chkmultunf(str, stage, multunf, ind)
713      UCHAR    *str;
714      END      *stage[];
715      UCHAR    *multunf[];
716      register int     ind;
717  1   {
718  1
719  1       static UCHAR *first;
720  1
721  2       if (*(first = str) == '\0') {
722  2           return (FALSE);
723  1       }
724  1       stage[ind] = Unfstgptr;
725  1       multunf[ind++] = first;
726  1
727  1       /* if a multiple unflection is indicated, duplicate the */
728  1       /* stageptr for the unflected forms */
729  1
730  2       while (*first != '\0') {
731  3           if (*first++ == UNFSEP) {
732  3               *(first - 1) = '\0';
733  4               if (strucmp(str, first) != 0) {
734  4                   stage[ind] = stage[ind - 1];
735  4                   multunf[ind++] = first;
736  3               }
737  2           }
738  1       }
739  1       return (ind);
740      }
741
742
743      multunftry(str, endptr, end1, end2)
744      UCHAR    *str;
745      UCHAR    *endptr;
746      UCHAR    *end1;
747      UCHAR    *end2;
748  1   {
749  1       static UCHAR *tmpptr;
750  1       static UCHAR tmpstr[MAXWORD];
751  1
752  1       tmpptr = strecpy(strecpy(tmpstr, str), end1);
753  2       if (!unftry(tmpstr)) {
754  2           *(tmpptr = tmpstr) = '\0';
755  1       }
756  1       strecpy(endptr, end2);
757  2       if (unftry(str)) {
758  3           if (tmpptr != tmpstr) {
759  3               *tmpptr++ = UNFSEP;
760  2           }
761  2           strecpy(tmpptr, str);
762  1       }
763  1       strecpy(str, tmpstr);
764  1       return (*str != '\0');
765      }
766
767      /* unflect a phrase. If the phrase is an exception, return the */
768      /* the unflected phrase. Otherwise, attempt unflection of the first */
769      /* word as a verb and the last word as a noun */
770
771
772      unfphrase(str, endptr, multunf, multstage)
773      register UCHAR   *str;
774      register UCHAR   *endptr;
775      UCHAR    *multunf[];
776      END      *multstage[];
777  1   {
778  1
779  1       static UCHAR *tmpptr;
```

```
78            static int      infindex;
78            static int      stageind;
78            static int      retval;
78       1    static UCHAR    rtstr[2 * MAXWORD];
78       1    static UCHAR    ltstr[MAXWORD];
78       1    static UCHAR    tmpstr[MAXWORD];
78       1    static UCHAR    vbstr[MAXWORD];
787      1
788      1    retval   = FALSE;
789      1    stageind = 0;
790      2    if ((infindex = unfexc(str, tmpstr, UNF_IR)) != ERROR) {
791      3        if (infindex == 0) {
792      3            return (FALSE);
793      2        }
794      3        if ((Unfstgptr = unfstage(infindex)) == NULL) {
795      3            return (FALSE);
796      2        }
797      2        strcpy(str, tmpstr);
798      2        multstage[stageind] = Unfstgptr;
799      2        multunf[stageind++] = str;
800      2        multunf[stageind]   = NULL;
801      2        return (TRUE);
802      1    }
803      1
804      1    tmpptr = strcpy(ltstr, str) - 1;
805      2    while (*tmpptr != ' ' && tmpptr != ltstr) {
806      2        tmpptr--;
807      1    }
808      2    if (tmpptr++ == ltstr) {
809      2        return (FALSE);
810      1    }
811      1    strcpy(rtstr, tmpptr);
812      1    strcpy(vbstr, endptr);
813      1    *tmpptr = '\0';
814      1    *endptr = '\0';
815      1    strcpy(tmpstr, str);
816      1
817      1    stageind = 0;
818      2    if (unfword(tmpstr, multunf, multstage)) {
819      3        while (multunf[stageind] != NULL) {
820      4            if (multstage[stageind]->en_rel == SI_PL) {
821      4                multstage[stageind] = unfstage(TP_SI + 1);
822      3            }
823      4            switch (multstage[stageind]->en_rel) {
824      4
825      4                case PR_PC:
82                       case PR_PS:
82       4               case PR_PP:
82       4               case PR_PX:
827      4               case TP_SI:
830      4                   strcpy(str, multunf[stageind]);
831      4                   appndstr(str, vbstr, UNFCODE);
832      4                   multunf[stageind++] = str;
833      4                   str = strend(multunf[stageind-1]) + 1;
834      4                   break;
835      4               default:
836      4                   removunf(&multunf[stageind],
837      4                       &multstage[stageind]);
838      4                   Unfstgptr = NULL;
839      3            }
840      2        }
841      3        if (stageind != 0) {
842      3            str    = strend(multunf[stageind-1]) + 1;
843      3            retval = TRUE;
844      2        }
845      1    }
846      2    if (unfword(rtstr, &multunf[stageind], &multstage[stageind])) {
847      3        while (multstage[stageind] != NULL) {
848      4            if (multstage[stageind]->en_rel != SI_PL) {
849      4                removunf(&multunf[stageind],
850      4                    &multstage[stageind]);
851      4                continue;
852      3            }
853      3            tmpptr = strcpy(str, ltstr);
854      3            strcpy(tmpptr, multunf[stageind]);
855      3            multunf[stageind++] = str;
856      3            str    = strend(str) + 1;
857      3            retval = TRUE;
858      2        }
859      1    }
860      1    return (retval);
861      }
862
863
864    removunf(unfptr, stgptr)
865    UCHAR   **unfptr;
866    END     **stgptr;
867    1  {
868    1
869    1      static int    i;
870    1
871    1      i = 0;
872    2      while (unfptr[i] != NULL && i < MAXUNF) {
873    2          unfptr[i] = unfptr[i + 1];
874    2          stgptr[i] = stgptr[i + 1];
875    2          i++;
876    1      }
877       }
```

What is claimed is:

1. An electronic word reference machine comprising:
a display screen,
a keyboard for entering characters to be displayed on said screen,
an entry key on said keyboard to enable the user to enter a word that appears on said screen, said word being an original entry word,
processing means responsive to said entry of said original entry word to provide on said screen a set of words having a predetermined relation to said original entry words,
edit means responsive to user selection of any word displayed on said screen by said processing means to provide the user selected word as an additional entry word,
said processing means being responsive to each of said additional entry words to provide a corresponding set of words having said predetermined relation to said additional entry word,
memory means for retaining each of said entry words in sequence as a history list,
means for re-accessing words on said history list, and
deletion means responsive to said history list in said memory means becoming full to delete the earliest additional entry words in sequence from said history list to provide room for the latest additional entry words; said original entry word being retained in said history list.

2. A machine thesaurus comprising:
a display screen,
a keyboard for entering characters to be displayed on said screen,
an entry key on said keyboard to enable the user to enter a word that appears on said screen, said word being an original entry word,
first processing means responsive to said entry of said original entry word to provide on said screen a set of synonyms for said original entry word and to divide said set of synonyms into subsets, each of said subsets having the same meaning core,
second processing means to provide on said screen the meaning core definition for each of said subsets,
first edit means responsive to user selection of any word displayed on said screen by any one of said processing means to provide the user selected word as an additional entry word,
second edit means to permit user input on said keyboard of any word as an additional entry word,
said first and second processing means being responsive to each of said additional entry words provided by said first and second entry means to provide a corresponding set of synonyms, synonym subsets and meaning core definitions,
memory means for retaining each of said entry words in sequence as a history list,
means for re-accessing words on said history list, and
deletion means responsive to said history list in said memory means becoming full to delete the earliest additional entry words in sequence from said history list to provide room for the latest additional entry words; said original entry word being retained in said history list,
whereby, the user can track through a user selected series of words to an expanded set of meanings as determined by the user.

3. A machine thesaurus comprising:
a display screen,
a keyboard for entering characters to be displayed on said screen,
an entry key on said keyboard to enable the user to enter a word that appears on said screen, said word being an original entry word,
first processing means responsive to said entry of said original entry word to provide on said screen a set of synonyms for said original entry word and to divide said set of synonyms into subsets, each of said subsets having the same meaning core,
second processing means to provide on said screen the meaning core definition for each of said subsets,
first edit means responsive to user selection of any word displayed on said screen by any one of said processing means to provide the user selected word as an additional entry word,
said first and second processing means being responsive to each of said additional entry words to provide a corresponding set of synonyms, synonym subsets and meaning core definitions,
memory means for retaining each of said entry words in sequence as a history list,
means for re-accessing words on said history list, and
deletion means responsive to said history list in said memory means becoming full to delete the earliest additional entry words in sequence from said history list to provide room for the latest additional entry words; said original entry word being retained in said history list.

4. The machine thesaurus of claim 3 further comprising:
second edit means to permit user input on said keyboard of any word as an additional entry word.

* * * * *